US012133254B2

(12) United States Patent
Freda et al.

(10) Patent No.: US 12,133,254 B2
(45) Date of Patent: Oct. 29, 2024

(54) SIMULTANEOUS UPLINK AND SIDELINK OPERATION

(71) Applicant: InterDigital Patent Holdings, Inc., Wilmington, DE (US)

(72) Inventors: Martino Freda, Laval (CA); Moon-il Lee, Melville, NY (US); Tuong Hoang, Montreal (CA); Paul Marinier, Brossard (CA); Tao Deng, Roslyn, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 384 days.

(21) Appl. No.: 17/631,649

(22) PCT Filed: Jul. 29, 2020

(86) PCT No.: PCT/US2020/044010
§ 371 (c)(1),
(2) Date: Jan. 31, 2022

(87) PCT Pub. No.: WO2021/021892
PCT Pub. Date: Feb. 4, 2021

(65) Prior Publication Data
US 2022/0279537 A1 Sep. 1, 2022

Related U.S. Application Data

(60) Provisional application No. 62/880,919, filed on Jul. 31, 2019, provisional application No. 62/909,138, filed on Oct. 1, 2019.

(51) Int. Cl.
*H04W 72/566* (2023.01)
*H04W 72/1263* (2023.01)
(Continued)

(52) U.S. Cl.
CPC ..... *H04W 72/569* (2023.01); *H04W 72/1263* (2013.01); *H04W 72/21* (2023.01); *H04W 72/23* (2023.01)

(58) Field of Classification Search
CPC .......... H04W 72/569; H04W 72/1263; H04W 72/21; H04W 72/23; H04W 72/20; H04W 72/566; H04W 76/14; H04L 1/1854
See application file for complete search history.

(56) References Cited

U.S. PATENT DOCUMENTS 11,641,599 B2   5/2023  Yi et al.
2006/0126565 A1  6/2006  Shaheen
(Continued)

FOREIGN PATENT DOCUMENTS

CN   102123512 A   7/2011
CN   102415187 A   4/2012
(Continued)

OTHER PUBLICATIONS

3rd Generation Partnership Project (3GPP), TS 23.287 V0.3.0, "Technical Specification Group Services and System Aspects, Architecture enhancements for 5G System (5GS) to Support Vehicle-to-Everything (V2X) services (Release 16)", Apr. 2019, pp. 1-40.
(Continued)

*Primary Examiner* — Kiet Tang
(74) *Attorney, Agent, or Firm* — Condo Roccia Koptiw LLP

(57) ABSTRACT

An apparatus may be configured to determine whether to prioritize a sidelink (SL) logical channel group (LCG) based on an SL prioritization threshold and a UL prioritization threshold, on a condition that a UL prioritization threshold is configured. The apparatus may be configured to determine whether a prioritization value associated with the SL LCG is lower than the SL prioritization threshold. The apparatus
(Continued)

may be configured to determine (e.g., at least) whether an uplink (UL) LCG has a prioritization value that is equal to or higher than the UL prioritization threshold. The apparatus may be configured to determine whether to prioritize SL buffer status reporting (BSR) based on a size of a UL grant and the determination of whether to prioritize the SL LCG. The apparatus may be configured to report a buffer status based on the determination of whether to prioritize the SL BSR.

13 Claims, 6 Drawing Sheets

(51) Int. Cl.
*H04W 72/21* (2023.01)
*H04W 72/23* (2023.01)

(56) References Cited

U.S. PATENT DOCUMENTS

| | | |
|---|---|---|
| 2011/0170495 A1 | 7/2011 | Earnshaw et al. |
| 2012/0057547 A1 | 3/2012 | Löhr et al. |
| 2012/0077510 A1 | 3/2012 | Chen et al. |
| 2015/0271809 A1 | 9/2015 | Kato et al. |
| 2016/0088624 A1 | 3/2016 | Lee et al. |
| 2016/0219620 A1 | 7/2016 | Lee et al. |
| 2017/0048745 A1 | 2/2017 | Yi et al. |
| 2017/0048903 A1 | 2/2017 | Yi et al. |
| 2017/0257876 A1 | 9/2017 | Loehr et al. |
| 2017/0353819 A1 | 12/2017 | Yin et al. |
| 2017/0353971 A1 | 12/2017 | Gupta et al. |
| 2017/0353972 A1 | 12/2017 | Babaei et al. |
| 2018/0048498 A1 | 2/2018 | Stern-Berkowitz et al. |
| 2018/0139724 A1 | 5/2018 | Loehr et al. |
| 2019/0053251 A1 | 2/2019 | Loehr et al. |
| 2019/0268918 A1 | 8/2019 | Baghel et al. |
| 2019/0342895 A1 | 11/2019 | Loehr et al. |
| 2020/0067738 A1 | 2/2020 | Ren et al. |
| 2020/0305169 A1 | 9/2020 | Loehr et al. |
| 2021/0022091 A1 | 1/2021 | Li et al. |
| 2021/0153065 A1 | 5/2021 | Adjakple et al. |
| 2021/0235464 A1 | 7/2021 | Loehr et al. |
| 2021/0410084 A1 | 12/2021 | Li et al. |
| 2022/0117038 A1* | 4/2022 | Agiwal .................. H04W 76/14 |
| 2022/0120687 A1 | 4/2022 | Fallarero et al. |
| 2022/0225382 A1 | 7/2022 | Yu et al. |
| 2022/0264590 A1* | 8/2022 | Han ...................... H04L 1/1854 |

FOREIGN PATENT DOCUMENTS

| | | |
|---|---|---|
| CN | 104704871 A | 6/2015 |
| CN | 107079530 A | 8/2017 |
| CN | 107431591 A | 12/2017 |
| CN | 107950047 A | 4/2018 |
| EP | 3206452 A1 | 8/2017 |
| JP | 2017-220931 A | 12/2017 |
| JP | 2018-509789 A | 4/2018 |
| JP | 2022519845 A | 3/2022 |
| JP | 2022549956 A | 11/2022 |
| WO | 2014/109558 A1 | 7/2014 |
| WO | 2016/025163 A1 | 2/2016 |
| WO | 2016/210048 A1 | 12/2016 |
| WO | 2017/137231 A1 | 8/2017 |
| WO | 2017/171251 A1 | 10/2017 |
| WO | 2018/075828 A1 | 4/2018 |
| WO | 2018/085568 A1 | 5/2018 |
| WO | 2020/006366 A1 | 1/2020 |

OTHER PUBLICATIONS

3rd Generation Partnership Project (3GPP), TS 23.287 V1.0.0, "Technical Specification Group Services and System Aspects, Architecture Enhancements for 5G System (5GS) to Support Vehicle-to-Everything (V2X) Services (Release 16)", May 2019, pp. 1-47.

3rd Generation Partnership Project (3GPP), TS 24.385 V15.0.0, "Technical Specification Group Core Network and Terminals, V2X Services Management Object (MO) (Release 15)", Jun. 2018, pp. 1-81.

3rd Generation Partnership Project (3GPP), TS 24.385 V15.1.0, "Technical Specification Group Core Network and Terminals, V2X Services Management Object (MO) (Release 15)", Sep. 2018, pp. 1-85.

3rd Generation Partnership Project (3GPP), TS 36.321 V15.1.0, "Technical Specification Group Radio Access Network, Evolved Universal Terrestrial Radio Access (E-UTRA), Medium Access Control (MAC) Protocol Specification (Release 15)", Mar. 2018, pp. 1-109.

3rd Generation Partnership Project (3GPP), TS 36.321 V15.5.0, "Technical Specification Group Radio Access Network, Evolved Universal Terrestrial Radio Access (E-UTRA), Medium Access Control (MAC) Protocol Specification (Release 15)", Mar. 2019, pp. 1-131.

3rd Generation Partnership Project (3GPP), TS 38.331 V15.2.0, "Technical Specification Group Radio Access Network, NR, Radio Resource Control (RRC) Protocol Specification (Release 15)", Jun. 2018, pp. 1-304.

3rd Generation Partnership Project (3GPP), TS 38.331 V15.5.1, "Technical Specification Group Radio Access Network, NR, Radio Resource Control (RRC) Protocol Specification (Release 15)", Apr. 2019, pp. 1-491.

3rd Generation Partnership Project (3GPP), R2-1907449, "Discussion on SL BSR procedure for NR SL Mode-1", 3GPP TSG-RAN WG2 Meeting #106, Huawei, HiSilicon, Reno, USA, May 13-17, 2019, 8 pages.

3rd Generation Partnership Project (3GPP), R2-1908291, "Summary of [Offline#704] UL/SL prioritization", 3GPP TSG-RAN WG2 Meeting #106, OPPO (rapporteur), Reno, USA, May 13-17, 2019, 8 pages.

"$3^{rd}$ Generation Partnership Project (3GPP), TR 22.886 V15.1.0, 3rd Generation Partnership Project; Technical Specification Group Services and System Aspects; Study on enhancement of 3GPP Support for 5G V2X Services (Release15)", Mar. 2017, 58 pages.

3rd Generation Partnership Project (3GPP), R2-1900219, "Sidelink SR/BSR in UU Interface", CATT, 3GPP TSG-RAN WG2 Meeting #105, Athens, Greece, Feb. 25-Mar. 1, 2019, 5 pages.

3rd Generation Partnership Project (3GPP), R2-1903722, "Prioritization of UL and SL Transmission", MediaTek Inc., 3GPP TSG-RAN WG2 Meeting #105bis, Xi'an, China, Apr. 8-12, 2019, 3 pages.

3rd Generation Partnership Project (3GPP), R2-1905568, "Left Issues on MAC for NR-V2X", OPPO, 3GPP TSG-RAN WG2 Meeting #106, Reno, US, May 13-17, 2019, 6 pages.

3rd Generation Partnership Project (3GPP), R2-1907354, "gNB-Scheduled Resource Allocation for Sidelink", Ericsson, 3GPP TSG-RAN WG2 #106, Reno, USA, May 13-17, 2019, 4 pages.

3rd Generation Partnership Project (3GPP), TR 23.786 V0.8.0, "Technical Specification Group Services and System Aspects, Study on Architecture Enhancements for EPS and 5G System to Support Advanced V2X Services (Release 16)", Aug. 2018, pp. 1-78.

3rd Generation Partnership Project (3GPP), TS 22.186 V15.2.0, "Technical Specification Group Services and System Aspects, Enhancement of 3GPP Support for V2X Scenarios, Stage 1 (Release 15)", Sep. 2017, pp. 1-16.

3rd Generation Partnership Project (3GPP), TS 23.303 V15.1.0, "Technical Specification Group Services and System Aspects, Proximity-Based Services (ProSe), Stage 2 (Release 15)", Jun. 2018, pp. 1-130.

3rd Generation Partnership Project (3GPP), TS 36.213 V14.4.0, "Technical Specification Group Radio Access Network, Evolved Universal Terrestrial Radio Access (E-UTRA), Physical Layer Procedures (Release 14)", Sep. 2017, 462 pages.

3rd Generation Partnership Project (3GPP), R2-1804299, "Correction to MCS Selection for V2X Sidelink Communication", Huawei, HiSilicon, 3GPP TSG-RAN WG2 Meeting #101bis, Sanya, China, Apr. 16-20, 2018, 6 pages.

(56) References Cited

OTHER PUBLICATIONS

3rd Generation Partnership Project (3GPP), R2-1910202, "Discussion on Prioritization Between SL BSR and UL BSR", Apple, 3GPP TSG-RAN WG2 Meeting #107, Prague, Czech Republic, Aug. 26-30, 2019, 4 pages.

3rd Generation Partnership Project (3GPP), R2-1910283, "Remaining Issue for Prioritization for NR V2X", Lenovo, Motorola Mobility, 3GPP TSG-RAN WG2 Meeting #107, Prague, Czech Republic, Aug. 26-30, 2019, 8 pages.

3rd Generation Partnership Project (3GPP), R2-1911491, "Discussion on BSR Prioritization", Xiaomi, 3GPP TSG-RAN WG2 Meeting #107, Prague, CZ, Aug. 26-30, 2019, 4 pages.

* cited by examiner

SIMULTANEOUS UPLINK AND SIDELINK OPERATION

CROSS-REFERENCE TO RELATED APPLICATIONS

This application is the National Stage Entry under 35 U.S.C. § 371 of Patent Cooperation Treaty Application No. PCT/US2020/044010, filed Jul. 29, 2020, which claims the benefit of U.S. Provisional Application No. 62/880,919, filed Jul. 31, 2019 and U.S. Provisional Application No. 62/909,138, filed Oct. 1, 2019, the contents of which are incorporated by reference herein.

BACKGROUND

Mobile communications using wireless communication continue to evolve. A fifth generation of mobile communication may be referred to as 5G. A previous (e.g., legacy) generation of mobile communication may be, for example, fourth generation (4G) long term evolution (LTE).

SUMMARY

Systems, methods, and instrumentalities are described herein for simultaneous uplink and sidelink operation. A wireless transmit/receive unit (WTRU) may be configured to operate using an uplink (UL) and a sidelink (SL) at the same time (e.g., for concurrent or simultaneous UL/SL operation). WTRU transmission and/or reception operation may be configured to account for simultaneous operation of the UL and the SL. A WTRU may transmit over one or more UL resources and one or more SL resources during the same set of orthogonal frequency division multiplexing (OFDM) symbols or slots, for example, based on one or more prioritization rules. A WTRU may drop an SL transmission or UL transmission, for example depending on one or more prioritization rules.

In examples, a method may be implemented to perform simultaneous uplink and sidelink operation. The method may be implemented, for example, by an apparatus (e.g., a WTRU), which may comprise one or more processors configured to execute the method as computer executable instructions, which may be stored on a computer readable medium or a computer program product, that, when executed by the one or more processors, performs the method. The computer readable medium or the computer program product may comprise instructions that cause one or more processors to perform the method by executing the instructions.

In examples, a WTRU may include a processor configured (e.g., programmed with executable instructions to implement a method) to determine whether to prioritize an SL LCG based on an SL prioritization threshold and a UL prioritization threshold (e.g., on a condition that a UL prioritization threshold is configured); determine whether a prioritization value associated with the SL LCG is lower than the SL prioritization threshold; determine (e.g., at least) whether a UL LCG has a prioritization value that is equal to or higher than the UL prioritization threshold (e.g., on a condition that the UL prioritization threshold is configured); determine whether to prioritize SL buffer status reporting (BSR) based on a size of a UL grant and the determination of whether to prioritize the SL LCG; and report a buffer status based on the determination of whether to prioritize the SL BSR. The SL prioritization threshold may be configured. The SL LCG may comprise, for example, an LCG that has a logical channel, e.g., including SL data. The UL LCG may comprise an LCG that has a logical channel, e.g., including UL data. The determination of (e.g., at least) whether the UL LCG has the prioritization value that is equal to or higher than the UL prioritization threshold may comprise, for example, a determination of whether a (e.g., each) UL LCG has a prioritization value that is equal to or higher than the UL prioritization threshold.

The SL BSR may be prioritized, for example, on a condition that the SL LCG is prioritized and on a condition that the size of the UL grant is insufficient for at least (e.g., all) the prioritized SL LCG if the SL BSR is not prioritized. The SL BSR (e.g., if prioritized) may be prioritized over the UL BSR. The SL BSR may be prioritized and truncated. The prioritized and truncated SL BSR may comprise the prioritized SL LCG and another SL LCG(s) if the another SL LCG(s) is prioritized and the size of the UL grant is sufficient for the prioritized SL LCG and the another SL LCG(s). An SL BSR may be truncated, for example, while not prioritized. The truncated SL BSR may comprise, for example, as many SL LCGs as allowed by the size of the UL grant. The SL LCG may be prioritized, for example, in response to a determination that a prioritization value associated with the SL LCG is lower than the SL prioritization threshold and that each UL LCG has a prioritization value that is equal to or higher than the UL prioritization threshold. The SL LCG may be prioritized, for example, in response to a determination that a prioritization value associated with the SL LCG is lower than the SL prioritization threshold and that the UL prioritization threshold is not configured. The UL LCG may be prioritized, for example, in response to a determination that a prioritization value associated with the UL LCG is lower than the UL prioritization threshold or that each SL LCG has a prioritization value that is equal to or higher than the SL prioritization threshold. The UL BSR may be prioritized, for example, in response to a determination that the SL LCG is not prioritized or a determination that the size of the UL grant is sufficient for the SL BSR if the SL BSR is not prioritized. The prioritization value associated with the SL LCG may be determined, for example, using a priority value of the highest priority among one or more LCHs that comprise SL data and belong to the SL LCG. The prioritization value associated with the UL LCG may be determined, for example, using a priority value of the highest priority among one or more LCHs that comprise UL data and belong to the UL LCG. The prioritization value associated with the SL LCG, if lower, may indicate, for example, a higher priority associated with the SL LCG, and, if higher, may indicate, for example, a lower priority associated with the SL LCG. The prioritization value associated with the UL LCG, if lower, may indicate, for example, a higher priority associated with the UL LCG, and, if higher, may indicate, for example, a lower priority associated with the UL LCG.

In examples, a WTRU may include a processor configured (e.g., programmed with executable instructions to implement a method) to determine that an SL priority threshold is configured; determine whether an LCG is to be included in a BSR based on a size of a UL grant, a priority associated with the LCG, the SL prioritization threshold, and a UL prioritization threshold (e.g., on a condition that the UL prioritization threshold is configured); and report a buffer status based on the determination of whether the LCG is to be included in the buffer status report.

Operation of concurrent or simultaneous UL/SL interfaces may include one or more procedures, such as UL/SL prioritization, SL/SL prioritization, avoidance of collisions between different UL/SL transmissions, etc. For example, a WTRU may prioritize UL transmissions or SL transmissions. Conditions for prioritizing one link over another may be based on one or more of the following: presence of an SL process/grant that is pending, time until the packet delay budget (PDB) of the packet expires, channel busy rate/ratio (CBR), channel occupancy ratio (CR), pathloss of SL and/or downlink (DL), transmission of an SL or UL hybrid automatic repeat request (HARQ) feedback, presence/absence of data on a UL/SL synchronization channel (SCH), properties of SL synchronization transmission, transmission of a scheduling request (SR), a transmission including a buffer status report (BSR) (e.g., SL or UL), a transmission including a control message of a specific type, depending on WTRU state, redundancy version (RV) associated with a HARQ-based transmission, blind vs HARQ-based retransmission, blind vs HARQ-based retransmission, unsuccessful/dropped transmission of previous transmissions of the same transport block (TB), based on the range requirements (e.g., minimum cell rate (MCR)) of the SL data, resource allocation mode associated with SL transmission, and/or the like.

Transmission prioritization may include, for example, one or more of the following: a WTRU may drop a scheduled transmission (e.g., a transmission with a lower priority); and/or a WTRU may reduce transmission power (e.g., associated with a lower priority transmission). A WTRU may inform a network (NW) that a transmission was dropped.

A WTRU may compare the priorities of UL/SL logical channels. A WTRU may determine which transmission to prioritize, for example, based on a configured priority of logical channels associated with a (e.g., each) transmission. A WTRU may compare the priority of (pre)configured logical channels (e.g., SL or UL, as appropriate) multiplexed into a (e.g., each) transmission. A logical channel (LCH) priority may be determined, for example, by one or more of the following: a WTRU may select a transmission (e.g., UL or SL) that includes the highest LCH priority; and/or a WTRU may compare a weighted sum of LCH priorities.

A WTRU may offset an SL priority, for example, based on sidelink measurements or quality of service (QoS). A WTRU may consider SL related measurements and/or SL QoS properties (e.g., in addition to LCH priority), for example, to determine whether to prioritize UL or SL transmission.

A WTRU may prioritize UL or SL, for example, based on a configuration of (e.g., UL and SL) thresholds. In examples, a WTRU may be configured with an SL threshold and/or a UL threshold. An SL threshold may be based on, for example, an LCH priority and/or or a QoS parameter related to SL. A UL threshold may be based on, for example, an LCH priority and/or a QoS parameter related to UL. A WTRU may compare a UL priority or an SL priority with a corresponding threshold, for example, to determine a priority of UL or SL. A WTRU may, based on a condition, inform a network about one or more transmissions dropped. A WTRU may inform a network of a dropped transmission, for example, if conditions in the UL and SL are met (e.g., the respective thresholds are exceeded in both the UL and SL). A WTRU may trigger an SR based on a condition. A WTRU may trigger one or more SRs, for example, if the respective thresholds are exceeded in the UL and SL. A WTRU may prioritize UL/SL based on the validity of a threshold. A WTRU may prioritize UL or SL, for example, based on selection of which threshold (e.g., UL or SL) is valid.

Prioritization of a UL BSR or an SL BSR may be based on priorities of LCGs. A WTRU may prioritize between a UL BSR and an SL BSR based on priorities of the LCGs associated with UL BSR and priorities of the LCGs associated with SL BSR. A WTRU may determine whether to prioritize a UL BSR or an SL BSR based on the priority of the data that is being reported in the corresponding BSR(s).

A WTRU may determine the type (e.g., prioritized or non-prioritized)/size of an SL BSR and/or a UL BSR based on the relative priorities in the corresponding BSR. A WTRU may determine the type/size of an SL BSR and/or a UL BSR, for example, based on one or more of the following: the LCGs to be reported in the SL BSR; the LCHs to be reported in the UL BSR; the size of the grant used to transmit the BSR; and/or the presence of additional UL grants available, which may meet the latency requirements associated with SL data. Additional UL grants may include configured grants.

A WTRU may perform transmission on UL and SL, for example, in the same time resources (e.g., slot). For example, a WTRU may be configured with conditions in which it performs transmission on SL and UL without dropping/prioritizing any of the SL/UL transmissions. A WTRU may perform transmission on UL and SL, for example, if the conditions are met. A WTRU may perform prioritization between UL/SL, for example, if the conditions are not met. A WTRU may transmit UL and SL, for example, if SL transmissions include (e.g., only) a physical sidelink feedback channel (PSFCH).

A WTRU may modify a planned/granted transmission format to allow transmissions on UL and/or SL. A WTRU may change a planned or granted transmission format, for example, to allow transmission on UL and SL in the same slot. A transmission format change may include, for example, one or more of: changing a UL/SL modulation and coding scheme (MCS), performing puncturing on the UL/SL transmission, and/or changing a TB size or transmission of an alternate TB. A WTRU may modify a planned/granted transmission format for UL and SL transmission in the same slot. A WTRU may inform a network and/or a peer WTRU of transmission on UL and/or SL. A WTRU may inform a network and/or a peer WTRU of change of expected format. A WTRU may inform a network or a peer WTRU of a transmission on UL and SL in the same slot.

A WTRU may report expected PSFCH transmissions, for example, to a network. A WTRU may report expected PSFCH transmission timing to a network. A WTRU may perform a resource selection procedure considering configured SR resources.

A WTRU may change a UL split between a master cell group (MCG) and a secondary cell group (SCG), for example, based on SL traffic. A WTRU may change a split of UL transmissions between MCG and SCG based on the presence of SL traffic.

A WTRU may change an active SL control/scheduling cell group (CG). A WTRU configured in dual connectivity (DC) may receive SL scheduling (e.g., mode 1 scheduling) from a (e.g., one of two) cell groups. A WTRU may decode SL scheduling (e.g., only) on a CG associated with an active SL control/scheduling at a given time.

DETAILED DESCRIPTION

Figure 1A:
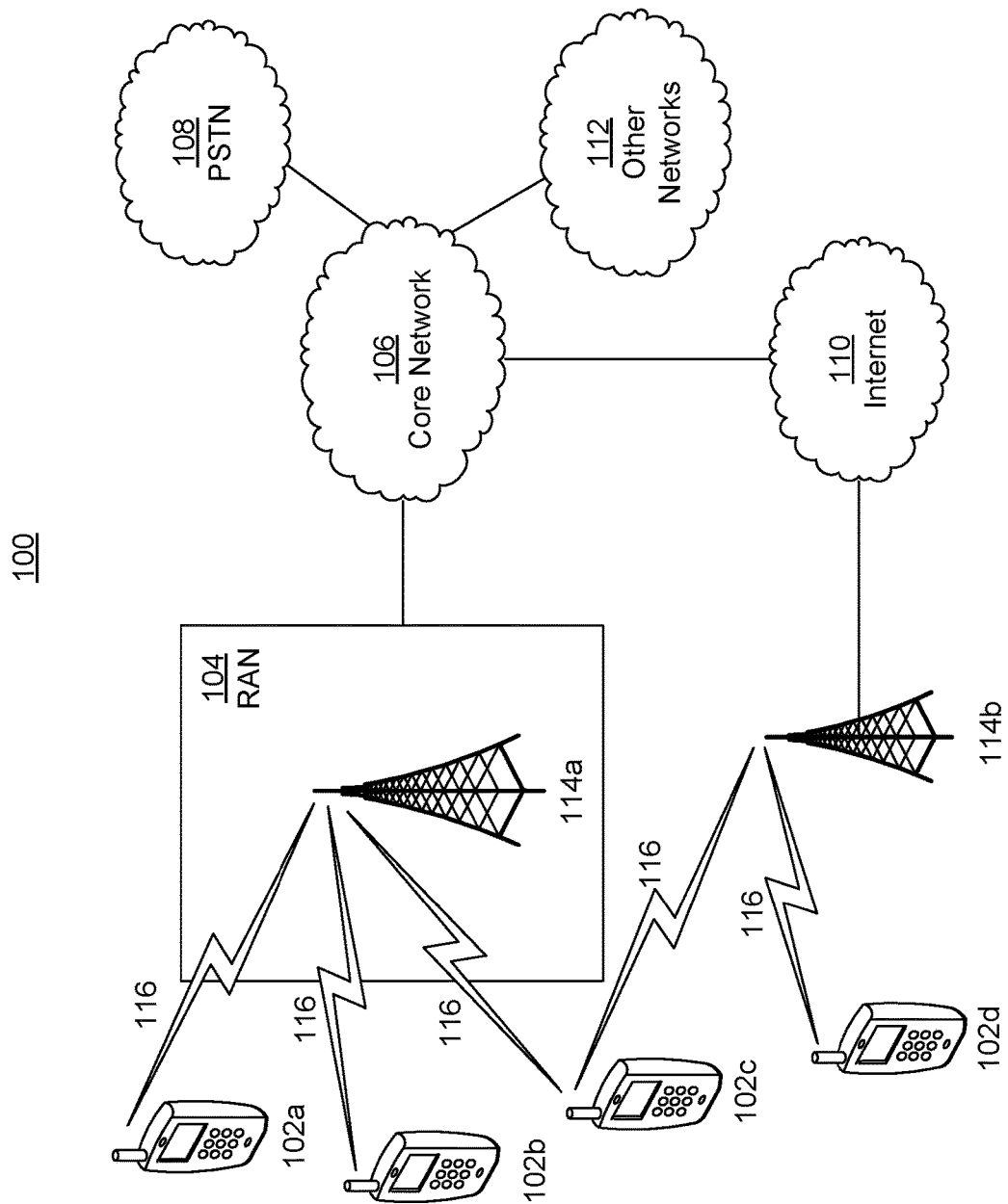
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
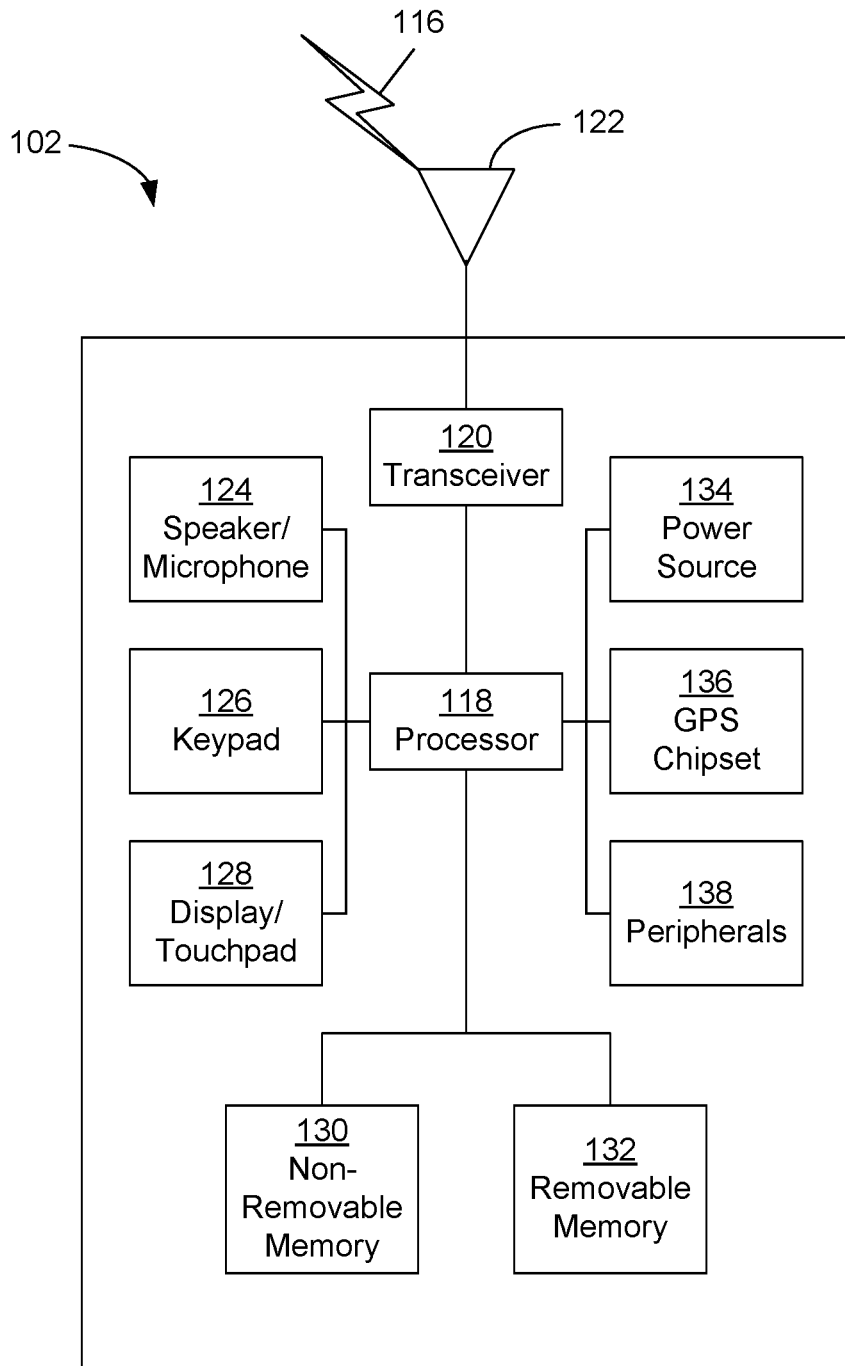
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
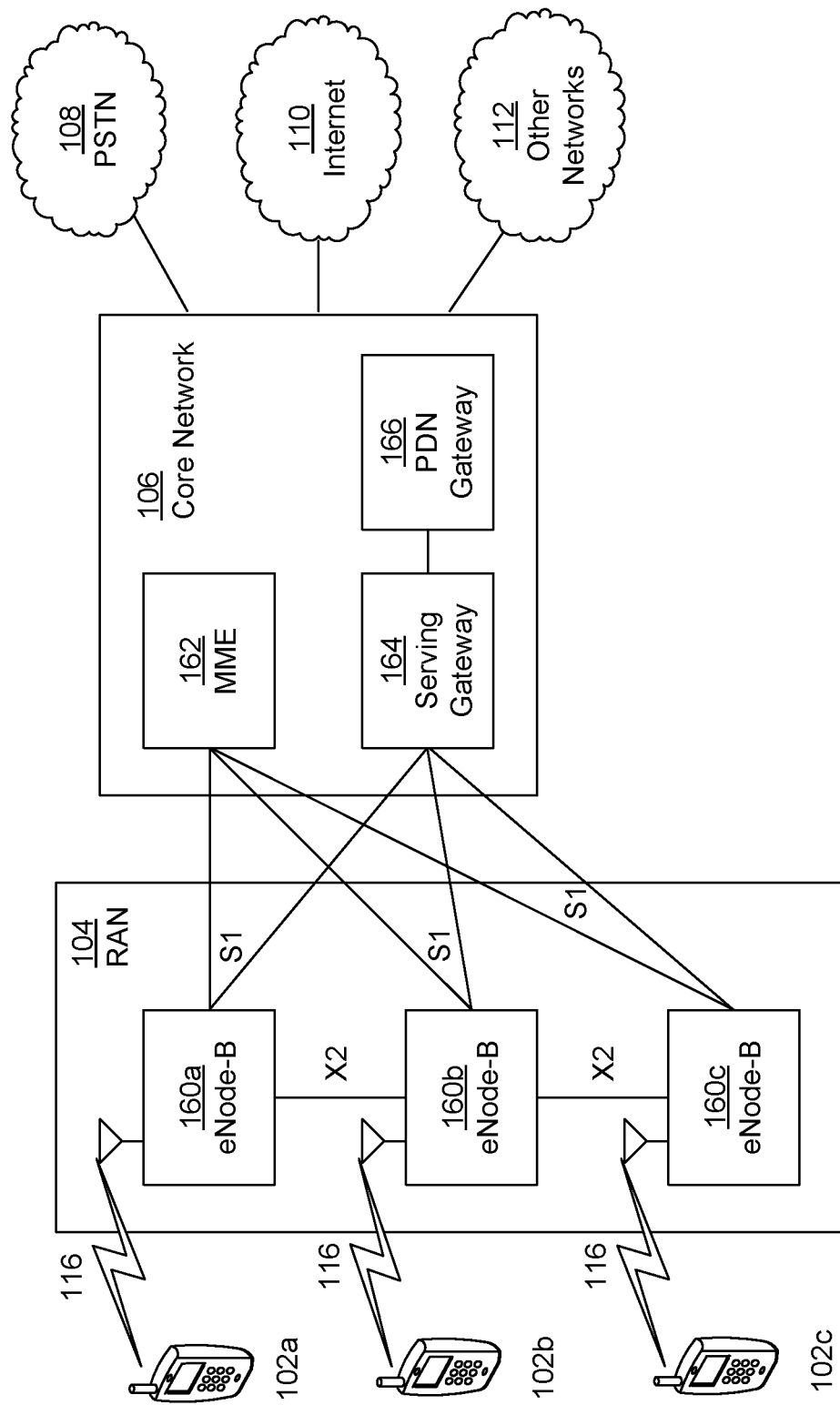
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
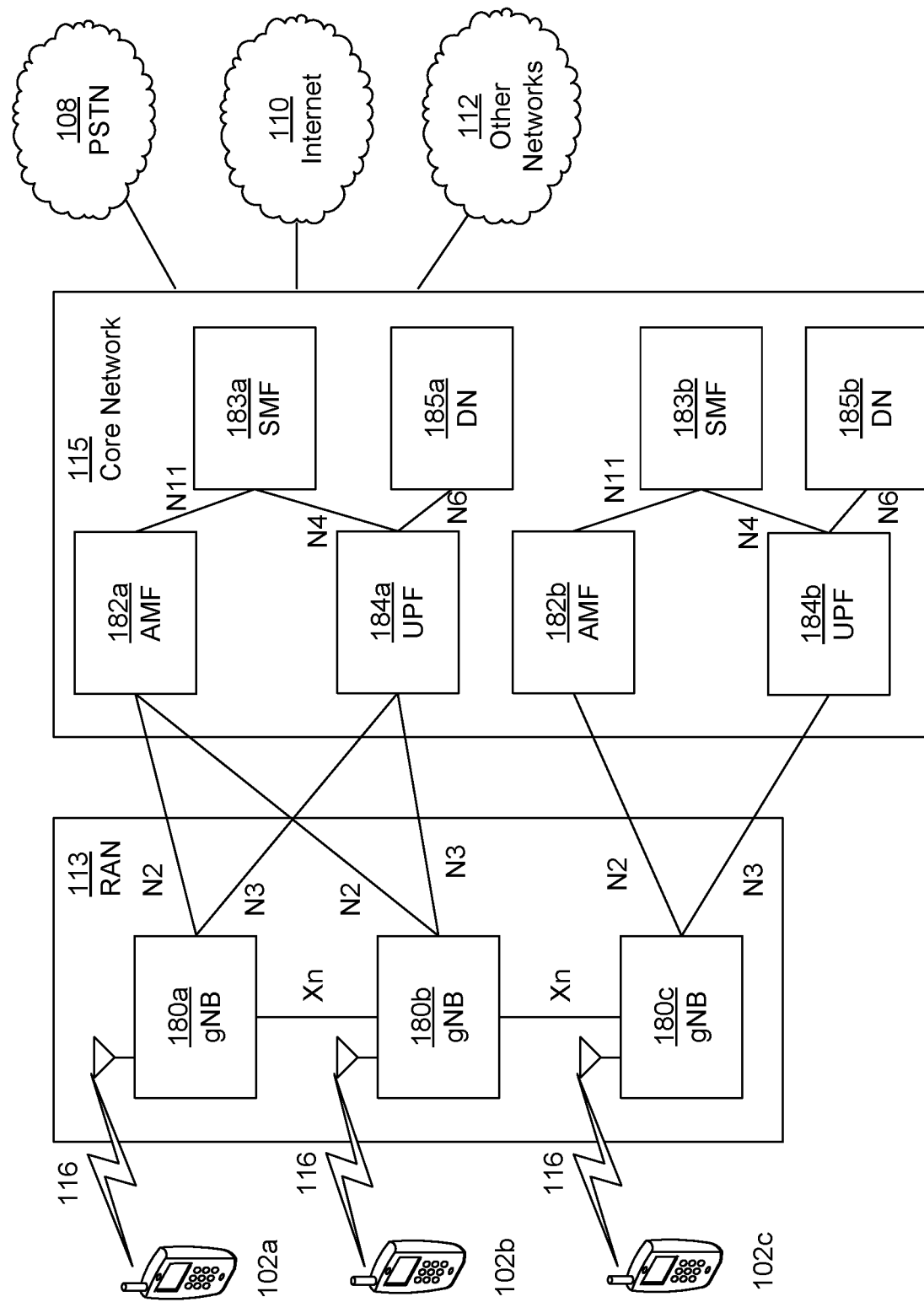
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Vehicular communication is a mode of communication where WTRUs may (e.g., directly) communicate with each other. Vehicle to everything (V2X) operations may include, for example, an in-coverage scenario, where WTRUs may receive assistance from the network to start transmitting and/or receiving V2X messages. V2X operations may include, for example, an out of coverage scenario, where WTRUs may use one or more pre-configured parameters to start transmitting and/or receiving V2X messages.

V2X communication may be based on Device-to-Device (D2D) communications. V2X communication services may include one or more of the following types: vehicle to vehicle (V2V), where vehicular WTRUs may communicate with each other directly; vehicle to infrastructure (V2I), where vehicular WTRUs may communicate with roadside units (RSUs)/eNBs; vehicle to network (V2N), where vehicular WTRUs may communicate with a core network (CN); and/or vehicle to pedestrian (V2P), where vehicular WTRUs may communicate with WTRUs with special conditions (e.g., low battery capacity).

V2X resource allocation may be performed in different modes. Multiple (e.g., two) modes of operation in V2X communication may be used. A network may (e.g., in Mode 3) give the WTRU a scheduling assignment for V2X sidelink transmission. A WTRU may (e.g., in Mode 4) autonomously select resources from a configured/pre-configured resource pool. V2X may use multiple categories of resource pools, including, for example: receiving pools, which may be monitored for receiving V2X transmissions, and/or V2X transmitting pools, which may be used by WTRUs to select one or more transmission resource (e.g., in Mode 4). Transmitting pools may not be used by WTRUs configured in Mode 3.

Resource pools may be semi-statically signaled to WTRUs, for example, via radio resource control (RRC) signaling. A WTRU may (e.g., in Mode 4) use sensing before selecting a resource from an RRC configured transmitting pool. V2X may support dynamic resource pools reconfiguration. Pool configuration may be carried, for example, via system information block (SIB) and/or dedicated RRC signaling.

New Radio (NR) V2X access technology may support, for example, enhanced Mobile Broadband (eMBB) and/or ultra-high reliability and low latency communications (URLLC). Enhanced V2X (eV2X) communication may be supported (e.g., in NR systems). For example, eV2X may support services for safety and non-safety scenarios (e.g., sensor sharing, automated driving, vehicle platooning, remote driving). Different eV2X services may have different performance levels. For example, some services may utilize 3 ms latency.

V2X may support, for example, one or more of vehicles platooning, advanced driving, extended sensors, and/or remote driving.

Vehicles platooning may enable vehicles to dynamically form a group travelling together. Vehicles in a platoon may receive periodic information (e.g., data) from another vehicle (e.g., the leading vehicle) to carry on platoon operations. This information may allow the distance between vehicles to become small (e.g., extremely small). For example, the gap distance between vehicles translated to time may be be low (sub second). Platooning applications may allow vehicles (e.g., vehicles following another vehicle) to be autonomously driven.

Advanced driving may enable semi-automated or fully-automated driving. Longer inter-vehicle distance may be assumed. A (e.g., each) vehicle and/or RSU may share data obtained from its local sensors with vehicles in proximity, allowing vehicles to coordinate their trajectories or maneuvers. A (e.g., each) vehicle may share its driving intention with vehicles in proximity. Information sharing or other coordination may support, for example, safer traveling, collision avoidance, and/or improved traffic efficiency.

Extended sensors may enable the exchange of raw or processed data gathered through local sensors or live video data among one or more vehicles, RSUs, pedestrian devices, V2X application servers, and/or the like. Extended sensors may enhance the perception vehicles have of their environment beyond what vehicles sensors can detect, which may provide a more holistic view of local situations.

Remote driving may enable a remote driver or a V2X application to operate a remote vehicle, for example, for passengers who cannot drive themselves and/or remote vehicles located in dangerous environments. Driving may be based on cloud computing, for example, where variation is limited and routes are predictable (e.g., public transportation). Cloud computing may be provided, for example, based on access to a cloud-based back-end service platform.

One-to-one link establishment in D2D may be used to support V2X sidelink. V2X may utilize broadcast communication (e.g., communication without establishing a link). V2X may utilize link establishment over sidelink. Multiple (e.g., two) WTRUs may establish a one-to-one proximity services (ProSe) direct communication, for example, over the PC5 protocol layer (e.g., on top of packet data convergence protocol (PDCP)). Signaling associated with one-to-one link establishment may be described herein.

One-to-one ProSe direct communication may be realized, for example, by establishing a secure layer-2 link over PC5 between multiple (e.g., two) WTRUs. A (e.g., each) WTRU may have a Layer-2 identifier (ID) for unicast communication included in the source layer-2 ID field of a (e.g., every) frame sent on the layer-2 link and/or in the destination Layer-2 ID of a (e.g., every) frame received on the layer-2 link. A layer-2 link for one-to-one ProSe direct communication may be identified, for example, by the combination of the Layer-2 IDs of multiple (e.g., two) WTRUs. A WTRU may engage in multiple layer-2 links for one-to-one ProSe direct communication using the same Layer-2 ID.

WTRUs engaged in isolated (e.g., non-relay) one-to-one communication may negotiate IP address allocation mechanisms and/or may exchange link-local IPv6 addresses, for example, if used during the link establishment procedure.

Figure 2:
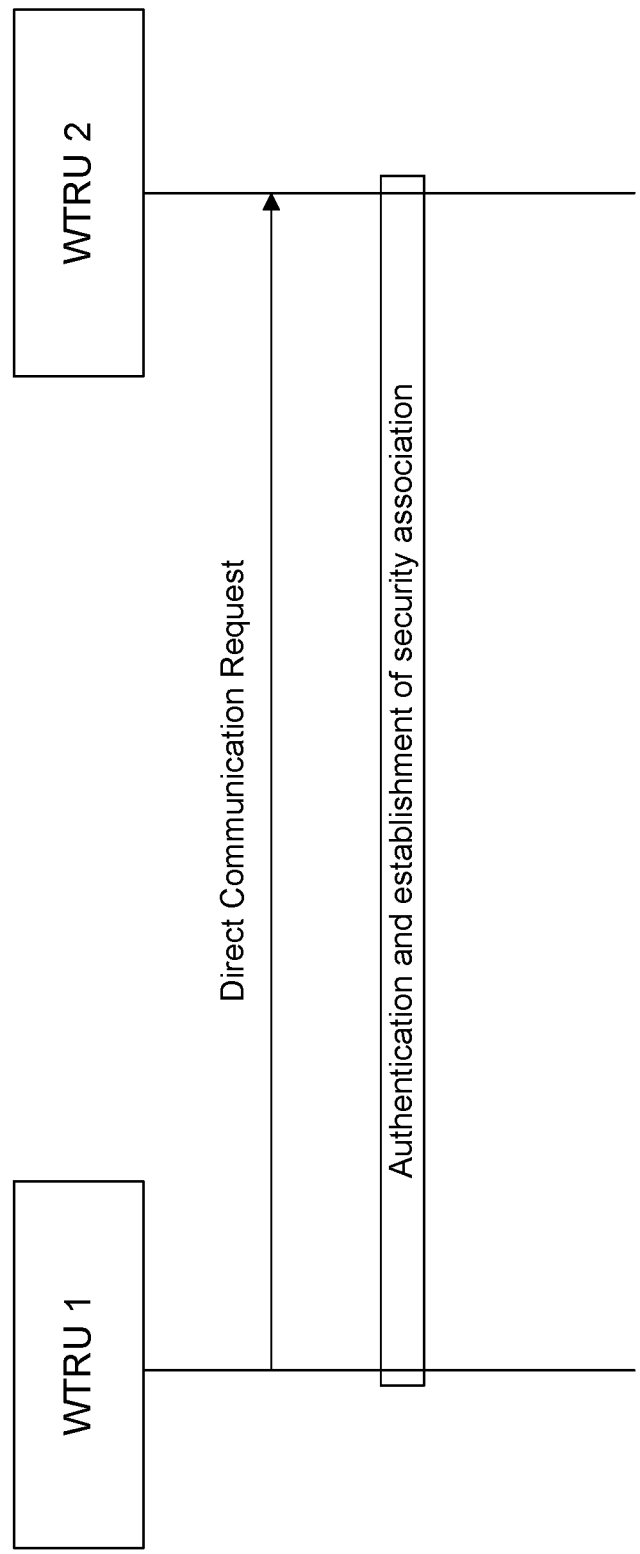
FIG. 2 illustrates an example of establishing a secure layer-2 link over PC5.

FIG. 2 illustrates an example of establishing a secure layer-2 link over PC5. As shown in FIG. 2, a first WTRU (WTRU-1) may send a direct communication request message to a second WTRU (WTRU-2), which may trigger mutual authentication. A message may include user information (info). WTRU-2 may initiate a procedure for mutual authentication. Successful completion of an authentication procedure may complete the establishment of a secure layer-2 link over PC5. WTRU-2 may include the user info in a response to WTRU-1.

A PC5 signaling protocol may support keep-alive functionality, which may be used to detect when the WTRUs are not in ProSe Communication range, for example, to proceed with implicit layer-2 link release.

A WTRU may be configured to perform link establishment for V2X (e.g., NR V2X). Procedures may be configured and utilized for the establishment and/or maintenance of a secure L2 link over PC5. Procedures may be enhanced and/or adapted for V2X. V2X signaling may be defined (e.g., at the RRC layer). V2X link/group handling may be configured. In examples of V2X communication, not all WTRUs may support and/or use unicast communication. Link establishment may be supported by a service announcement. For example, a service announcement may be used to inform a peer of the presence of a WTRU and/or a capability of the WTRU for unicast communication (e.g. channel to operate, services supported, and/or the like).

A service announcement may be made accessible to one or more (e.g., all) WTRUs that may be interested in using the service. An announcement may be configured, for example, to be sent over a dedicated channel (e.g., similar to how a wireless access in vehicular environments (WAVE) service advertisement (WSA) may be handled), or to be piggybacked on periodic messages from supporting WTRUs.

A quality of service (QoS) for NR V2X may be determined. A QoS model may be used for NR V2X. A QoS over PC5 may be supported with a ProSe per-packet priority (PPPP). The application layer may be allowed to mark the packets with the PPPP. PPPP may indicate a QoS level. A packet delay budget (PDB) may be derived from the PPPP. The QoS requirements for NR V2X may be specified and/or configured. Performance indicators may be specified, for example, with one or more of the following parameters: payload (Bytes); transmission rate (message/sec); maximum end-to-end latency (ms); reliability (%); data rate (Mbps); minimum required communication range (meters); and/or the like.

A set (e.g., the same set) of service requirements may apply to PC5 based V2X communication and Uu based V2X communication. The QoS characteristics may be represented, for example, with a quality indicator (e.g., 5G quality indicator (5QI)).

A unified QoS model may be used for PC5 and Uu, (e.g., a model that uses 5QIs for V2X communication over PC5), which may permit the application layer to provide a consistent indication of QoS requirements regardless of the link used.

5GS V2X capable WTRUs may handle multiple (e.g., three) different types of traffic (e.g., broadcast, multicast, and unicast).

A (e.g., the same) QoS model utilized for Uu may be utilized for unicast type of traffic. For example, a (e.g., each) unicast link may be treated as a bearer and QoS flows may be associated with the unicast links/bearers. One or more (e.g., all) QoS characteristics defined for 5QI (e.g., and the additional parameter of data rate) may be applied to a QoS model/flow. A minimum communication range may be treated as a (e.g., an additional) parameter (e.g., specifically for PC5 use). In examples, similar configurations may be applied to multicast traffic. Multicast may be treated as a special case of unicast, for example, with multiple defined receivers of the traffic.

Broadcast traffic may not have a bearer concept. A (e.g., each) message may have different characteristics (e.g., according to broadcast application requirements). In an example, a 5QI may be used similar to PPPP/ProSe Per-Packet Reliability (PPPR), for example, to be tagged with each packet. A 5QI may (e.g., be able to) represent one or more (e.g., all) characteristics that may be used for a PC5 broadcast operation, such as one or more of latency, priority, reliability, etc. A group of V2X broadcast specific 5QIs (i.e. VQIs) may be defined/configured for PC5 use.

In an example, PC5 QoS parameters may be negotiated at (e.g., upon or during) the establishment of one-to-one communication procedure. A one-to-one communication establishment procedure may be enhanced to support PC5 QoS parameter negotiation between multiple (e.g., two) WTRUs. A (e.g., the same) QoS may be used in both directions, for example, after a PC5 QoS parameter negotiation procedure.

As previously indicated, FIG. 2 illustrates an example of establishing a secure layer-2 link over PC5. WTRUs engaged in one-to-one communication may negotiate PC5 QoS parameters, for example, during a link establishment procedure. A first WTRU (WTRU-1) may send a direct communication request message to a second WTRU (WTRU-2), which may trigger mutual authentication. The message may include the requested PC5 QoS parameters. WTRU-2 may initiate the procedure for mutual authentication. WTRU-2 may include the accepted PC5 QoS parameters in the response message (e.g., to WTRU-1).

UL/SL prioritization may be supported in V2X. V2X devices may support simultaneous transmissions of UL and SL, for example, in one or more of the following scenarios: UL TX and SL TX may use separate TX chains and/or separate power budget; UL TX and SL TX may use separate TX chains while sharing a power budget; and/or UL TX and SL TX may share TX chains and power budget.

Simultaneous transmission of UL and SL may be subject to one or more rules (e.g., for various scenarios, such as when there are different carriers (e.g., where simultaneous TX on UL and SL may not be performed or modified) and when there are potential simultaneous TX on UL and SL on the same carrier. In examples for the same carrier (e.g., where simultaneous TX and RX may not be used), a WTRU may drop a UL TX or an SL TX, for example, if the UL TX overlaps in the time domain with the SL TX in the shared (or same) carrier frequency. A WTRU may drop a UL TX, for example, if the PPPP of the SL packet is above a (pre) configured PPPP value (e.g., a PPPP threshold). The WTRU may drop the SL TX, for example, otherwise. In examples for different carriers (e.g., where simultaneous TX and RX is possible (e.g., if UL TX and SL TX use separate TX chains), a WTRU may drop a UL TX or an SL TX or reduce power thereof, for example, if a UL TX overlaps in the time domain with an SL TX in a different carrier frequency. A WTRU may drop a UL TX or reduce the UL TX power, for example, if the PPPP of the SL packet is above a (pre) configured PPPP threshold. A WTRU may drop an SL TX or reduce SL TX power, for example, otherwise.

The aforementioned UL/SL prioritization rules (e.g., for LTE V2X) may differ from some implementations of V2X (e.g., NR V2X). Some V2X (e.g., NR V2X) implementations may have one or more of the following properties: a different QoS model; stringent QoS for SL and/or UL; unicast transmission for SL; and/or simultaneous transmission in mode 1 and mode 2.

In some implementations of V2X (e.g., NR V2X), a V2X QoS model may be based on a PC5 quality indicator (PQI) (e.g., rather than PPPP, such as in LTE V2X). A QoS model may be a flow-based QoS (e.g., similar to UL), for example, rather than a per packet based model (e.g., in LTE V2X). PC5 may be a WTRU to WTRU communication interface for V2X.

In some implementations of V2X (e.g., NR V2X), stringent QoS may be applied for SL and/or UL. NR SL and/or NR Uu traffic may have stringent QoS requirements (e.g., NR V2X may have more stringent QoS requirements than LTE V2X). The impact of dropping packets may be more pronounced for some V2X traffic/services than other V2X traffic/services.

In some implementations of V2X (e.g., NR V2X), unicast transmission may be used in SL. Unicast transmission may use HARQ and/or channel state information (CSI) feedback. Unicast SL transmissions may be dropped (e.g., as part of an UL/SL prioritization). HARQ feedback may be carried in a different SL physical layer (PHY) channel (e.g., a Physical Sidelink Feedback Channel (PSFCH)). HARQ feedback carried in a different SL PHY channel may impact how UL and/or SL transmissions are considered/prioritized, for example, when there is a collision of UL and SL transmissions.

In some implementations of V2X (e.g., NR V2X), transmission in mode 1 and mode 2 may be simultaneous. V2X may support simultaneous transmissions in network (NW) scheduled and/or WTRU autonomous modes, which may create additional collision scenarios for UL and SL transmissions (e.g., when UL and SL operation coexist on the same of different carriers).

A WTRU may be configured to operate with the coexistence of UL and SL operation on the same or different carriers, for example, to support V2X communications.

UL/SL operation (e.g., simultaneous UL/SL operation) may be based on one or more of the following: UL/SL prioritization, SL/SL prioritization, avoidance of collisions between different UL/SL transmissions, and/or the like.

UL/SL prioritization may be based on one or more of the following: conditions for prioritizing one link over another, deriving priority metric of different links based on data characteristics, BSR procedure for UL and/or SL, and/or the like.

UL/SL prioritization may be determined, for example, by a WTRU. A WTRU may (e.g., make a determination to) perform UL transmission or SL transmission, for example, at a given time instance (e.g., a time when UL and SL transmissions are scheduled at the same time). A WTRU may (e.g., decide to) select UL or SL transmission for a given time instance (e.g., slot). A WTRU may (e.g., decide to) select a UL or SL transmission, for example, based on one or more limitations at the WTRU. The limitations may include, for example, one or more of the following: a (e.g., single) TX chain shared between UL and SL (e.g., where the transmissions may be on different carriers); UL and SL transmissions may be scheduled on the same carrier; and/or UL and/or SL transmissions may result in interference (e.g., if transmitted simultaneously).

A WTRU may be configured to prioritize UL transmissions or SL transmissions. Prioritization of transmissions may involve the WTRU performing, for example, one or more of the following: dropping a scheduled transmission (e.g., a transmission with a lower priority); and/or reducing the transmission power of a transmission (e.g., for a transmission with a lower priority); and/or the like. A WTRU may do one or more of the following (e.g., if the WTRU drops one of the scheduled transmissions): maintain a dropped transmission in the HARQ buffer and/or defer the transmission (e.g., to the next scheduled transmission); drop a transmission while assuming the transmission is performed, increase the redundancy version (RV) associated with the transport block, and/or perform transmission of the next redundancy version for the transmission (e.g., at the scheduled time).

A WTRU may prioritize a transmission (e.g., UL or SL), for example, based on one or more conditions. Conditions for prioritizing links (e.g., UL, SL) may be based on, for example, one or more (e.g., a combination) of the following: presence of an SL process/grant that is pending, time until the PDB of the packet expires, channel busy ratio (CBR), channel occupancy ratio (CR), pathloss of SL and/or DL, transmission of SL or UL HARQ feedback, presence/absence of data on an UL/SL synchronization channel (SCH), properties of SL synchronization transmission, transmission of a scheduling request (SR), transmission including a buffer status report (BSR) (e.g., SL or UL), transmission including a BSR (e.g., SL or UL), transmission including a control message of a specific type (e.g., depending on a WTRU state), redundancy version associated with a HARQ-based transmission, blind vs HARQ-based retransmission, blind vs HARQ-based retransmission, an unsuccessful/dropped transmission of previous transmissions of the same transport block (TB), range requirements (e.g., minimum cell rate (MCR)) of the SL data, a resource allocation mode associated with an SL transmission, and/or the like.

Conditions for link prioritization may include a presence of an SL process/grant that is pending. A WTRU may prioritize a UL, for example, if there is another pending grant on SL. The pending grant on SL may meet the QoS requirements of the SL packet being dropped.

Conditions for link prioritization may include time until the PDB of the packet expires. A WTRU may prioritize a UL, for example, if the PDB of the packet, and/or the remaining time between the SL grant and the PDB of the packet, is below a certain value (e.g., threshold). The threshold may depend on a channel busy rate/ratio (CBR) (e.g., CBR of the sidelink).

Conditions for link prioritization may include a CBR. A UL transmission may be prioritized to lower congestion for sidelink resources, for example, if CBR is higher than a certain value (e.g., threshold). An SL transmission may be prioritized high, for example, if CBR is lower than the threshold. The threshold may be configured, for example, by higher layer signaling. The threshold may be configured, for example, by gNB or a WTRU.

Conditions for link prioritization may include a channel occupancy ratio (CR). A UL transmission may be prioritized, for example, if CR is higher than a certain value (e.g., threshold), which may indicate a WTRU is using more SL resource(s) than expected.

Conditions for link prioritization may include pathloss of SL and/or DL. An SL transmission may be prioritized and/or the link for sidelink may be better than uplink, for example, if a DL pathloss value is higher than an SL pathloss. A UL transmission may be prioritized, for example, if a DL pathloss value is not higher than an SL pathloss. A weighting factor may be used, for example, to compare DL pathloss and SL pathloss. For example, DL pathloss may be represented by $\alpha \cdot PL_{DL}$, and/or SL pathloss may be represented by $\beta \cdot PL_{SL}$, where $\alpha$ may be the weighting factor for DL pathloss and $\beta$ may be the weighting factor for SL pathloss. The weighting factors may be configured (e.g., by the network).

Conditions for link prioritization may include transmission of SL or UL HARQ feedback. A WTRU may prioritize a UL/SL transmission, for example, if the transmission is for sending HARQ feedback. A WTRU may prioritize an SL transmission over a UL transmission, for example, if the SL transmission includes a transmission on PSFCH. A WTRU may prioritize a UL transmission over an SL transmission, for example, if the UL transmission includes HARQ feedback on uplink control information (UCI) and/or a physical uplink shared channel (PUSCH).

A WTRU may be configured, for example, to consider transmission of UL and/or SL HARQ feedback as lower priority than other transmissions (e.g., data). A WTRU may prioritize UL transmissions, for example, if an SL transmission includes (e.g., only) a PSFCH transmission.

Prioritization of UL or SL HARQ feedback may depend on one or more (e.g., a combination) of properties associated with HARQ feedback. Properties that may affect the prioritization of UL or SL HARQ feedback may include, for example, one or more of the following: a QoS of data associated with HARQ feedback; a redundancy version associated with HARQ feedback; whether ACK/NACK is reported; a TB size; an indication by a WTRU transmitting data; a cast associated with HARQ feedback, the number of HARQ bits in a HARQ feedback transmission, and/or the like.

Prioritization of UL or SL HARQ feedback may be based on a QoS of data associated with the HARQ feedback. A WTRU may prioritize a UL/SL HARQ transmission, for example, depending on a QoS of the data associated with the HARQ transmission. A WTRU may compare a QoS metric associated with data for which the HARQ is being transmitted with a QoS metric of data transmitted on another link. The QoS metric of the data transmitted on the other link may be similar to the QoS metric associated with data for which the HARQ is being transmitted. In examples, a WTRU may prioritize a HARQ transmission on SL, for example, if the priority of the transmission (e.g., signaled in SCI) for which HARQ is being transmitted is higher than a priority of a data transmission on the UL. A WTRU may compare a QoS metric associated with data for which the HARQ is being transmitted with a certain value (e.g., a threshold). The threshold may be (pre)configured. A WTRU may prioritize a HARQ transmission on SL, for example, if the priority of the transmission for which HARQ is being transmitted is above a threshold. A WTRU may prioritize a HARQ transmission on SL, for example, if the priority of the transmission (e.g., signaled in SCI) for which HARQ is being transmitted is above a threshold. The threshold may depend on a measured occupancy of the channel. A QoS metric may be related to an LCH priority associated with the data being acknowledged. A WTRU may prioritize a HARQ transmission, for example, based on the priority of an LCH for the data for which HARQ feedback is being transmitted. A WTRU may prioritize a HARQ transmission, for example, if the highest priority LCH for the data for which HARQ feedback is being transmitted is higher than the LCH priority of data on another link. A WTRU may prioritize a HARQ transmission, for example, if the highest priority LCH for the data for which HARQ feedback is being transmitted is higher than a threshold. The threshold may include a (pre)configured threshold.

Prioritization of UL or SL HARQ feedback may be based on a redundancy version associated with HARQ feedback. A WTRU may prioritize a UL/SL HARQ transmission, for example, depending on a redundancy version being transmitted. In examples, a WTRU may prioritize a HARQ feedback transmission associated with the last HARQ retransmission or N last HARQ retransmissions, for example over an initial transmission and/or early retransmissions. The value of N may be configured (e.g., preconfigured). The value of N may depend on, for example, one or more of the following: a measured CBR, a measured CQI, WTRU velocity, or other (e.g., similar) measurement of the quality of a link between WTRUs. A WTRU may assign a higher level of priority to a (e.g., each) HARQ feedback associated with a larger redundancy version. A WTRU may assign a higher level of priority with a (e.g., each) HARQ feedback associated with a larger redundancy version, for example, when comparing with UL transmission. In examples, HARQ feedback associated with an initial transmission may be at priority P1, HARQ feedback associated with the first retransmission may be at priority P2, and so on, where P1<P2< . . . . A peer WTRU may be informed that it correctly received a transmission.

Prioritization of UL or SL HARQ feedback may be based on whether an acknowledgement (ACK)/NACK is reported. A WTRU may prioritize a UL/SL HARQ transmission, for example, if the transmission is associated with a transmission of an ACK.

Prioritization of UL or SL HARQ feedback may be based on transport block (TB) size. A WTRU may prioritize UL/SL HARQ transmission, for example, if the resource size the transmission associated with the HARQ feedback is above a certain value (e.g., a (pre)configured threshold). A WTRU may prioritize UL/SL HARQ transmission, for example, if the TB size of the transmission associated with the HARQ feedback is above a threshold (e.g., a (pre) configured threshold).

Prioritization of UL or SL HARQ feedback may be based on indication by a WTRU transmitting the data. A WTRU may prioritize SL HARQ transmission, for example, based on the presence or absence of an indication by a peer WTRU. A WTRU may prioritize SL HARQ transmission, for example, based on the presence or absence of an indication by another entity (e.g., gNB, group leader). A WTRU may prioritize HARQ feedback for a SL transmission, for example, if the WTRU performing the data transmission includes an indication. In examples, an indication may be related to intention (e.g., of the peer WTRUs) to re-use re-transmission resources.

Prioritization of UL or SL HARQ feedback may be based on the cast associated with HARQ feedback. A WTRU may prioritize an SL HARQ transmission associated with a cast or a type of cast while the WTRU may not prioritize SL HARQ transmission associated with other cast(s) or other type(s) of cast. For example, a WTRU may prioritize an SL HARQ transmission for unicast, but not groupcast. A WTRU may associate a different priority level for SL HARQ transmission for unicast vs SL HARQ transmission for groupcast. A WTRU may, for example, use one or more rules and/or conditions for determining whether to prioritize unicast HARQ feedback and one or more different rules and/or conditions for determining whether to prioritize groupcast HARQ feedback. The one or more rules and/or conditions may be, for example, one or more rules and/or conditions described herein.

Prioritization of UL or SL HARQ feedback may be based on the number of HARQ bits in a HARQ feedback transmission. A WTRU may prioritize SL HARQ transmission, for example, if the number of HARQ bits in a HARQ transmission is larger than a certain value (e.g., a threshold). The threshold may include a (pre)configured or predetermined threshold.

A WTRU may prioritize HARQ transmissions when one or more (e.g., a combination) of the conditions (e.g., as described herein) is satisfied. In examples, a WTRU may prioritize PSFCH transmissions over UL transmissions, for example, if an acknowledgement (ACK) is being transmitted, and/or the resource size associated with the SL data transmission is larger than a threshold. A threshold may depend, for example, on the measured CBR. A WTRU may prioritize a PSFCH transmission over a UL transmission, for example, if ACK is being transmitted, and/or a peer WTRU indicated (e.g. in the SCI associated with the data transmission) that it intends to re-use a reserved retransmission resource. A WTRU may prioritize a PSFCH transmission over a UL transmission, for example, if an ACK is being transmitted, and/or the QoS associated with the data transmission being acknowledged is above a threshold (e.g., a (pre)configured threshold). A WTRU may prioritize a PSFCH transmission over a UL transmission, for example, if the HARQ feedback transmission corresponds to a retransmission. In examples, a WTRU may prioritize PSFCH transmission over UL transmission, for example, if the HARQ feedback transmission corresponds to the Nth or larger retransmission, and/or the priority associated with the transmission is higher than the priority associated with the UL data transmission.

Conditions for link prioritization may include presence/absence of data on a UL/SL SCH. A WTRU may prioritize a UL/SL transmission, for example, based on the presence of data associated with the transmission. A WTRU may prioritize/deprioritize SL, for example, if UL transmissions include (e.g., only) PHY/L1 control signaling. The L1 signaling may include transmission of CSI on PUSCH without UL SCH. A WTRU may prioritize SL transmissions, for example, if UL transmissions include (e.g., only) an SRS transmission.

Conditions for link prioritization may include properties of SL synchronization transmission. A WTRU may prioritize an SL synchronization signal (SLSS) transmission, which may be associated with a specific type or property. A WTRU may prioritize transmission of an SLSS over a UL transmission, for example, if the WTRU is configured as a group leader. A WTRU may prioritize transmission of an SLSS over a UL transmission, for example, if the WTRU is in an active unicast session. An SLSS may be used interchangeably with a sidelink synchronization signal block (SL-SSB), a sidelink synchronization signal, and a physical broadcasting channel block (SL-SSB/PBCH). A WTRU may prioritize certain (e.g., selected) types of UL transmission (e.g., URLLC) over an SLSS transmission. For example, a WTRU may be configured with a set of UL LCHs. The set of UL LCHs may be prioritized over an SLSS. An SLSS may be prioritized over a UL transmission, for example, if a WTRU has not received an SLSS signal for a time period (e.g., longer than X time period). Time period X may be, for example, predetermined, preconfigured, configured, or indicated by a gNB.

Conditions for link prioritization may include transmission of an SR. A WTRU may prioritize an SR transmission over an SL transmission. An SR transmission may be triggered by a WTRU. For example, a WTRU may prioritize (e.g., always prioritize) UL transmissions of an SR over SL transmissions. A WTRU may prioritize SR transmissions in UL, for example, based on one or more (e.g., a combination) of the following properties associated with the SR transmission: whether SR is triggered for the arrival of UL data or SL data, the LCH(s) associated with an SR configuration, the amount of time between SR resources, and/or the like.

Implementations(s) and/or feature(s) herein may be described in terms of behaviors (e.g., actions) of a WTRU. In examples, the behaviors may be performed by an entity such as a NW node or other devices, which may not include WTRU functionality(ies). In some examples (e.g., certain use cases or certain time instances), the entity or other devices may behave like a WTRU. The one or more examples herein may be equally applicable to the entity or other devices.

A WTRU may prioritize SR transmissions in UL, for example, based on whether an SR is triggered for the arrival of UL data or SL data. Prioritization based on the presence of SR may depend on whether the SR is configured for UL data or SL data. In examples, a WTRU may prioritize a UL transmission, for example, if the UL transmission includes an SR transmission associated with an SL transmission. A WTRU may not prioritize a UL transmission, for example, if the UL transmission includes an SR transmission associated with a UL transmission. A WTRU may prioritize a UL transmission, for example, if the UL transmission includes an SR transmission associated with a UL transmission. A WTRU may not prioritize a UL transmission, for example, if the UL transmission includes an SR transmission associated with an SL transmission. A WTRU may prioritize a UL transmission, for example, if the UL transmission includes SR transmissions associated with UL and SL transmissions.

A WTRU may prioritize SR transmissions in UL, for example, based on the LCH(s) associated with an SR configuration. A WTRU may prioritize UL transmissions when transmitting SR, for example, based on LCH(s) and/or the QoS properties configured for the SR that is triggered. A WTRU may prioritize UL transmissions, for example, if the WTRU transmits SR associated with logical channels configured with a priority. A WTRU may prioritize UL transmissions, for example, if the WTRU transmits SR associated with logical channels configured with a priority larger than a (pre)configured value. A WTRU may prioritize UL transmissions, for example, if SR is associated with logical channels configured with a priority larger than the priority of the colliding SL transmissions.

A WTRU may prioritize SR transmissions in UL, for example, based on the amount of time between SR resources. A WTRU may prioritize UL transmissions when transmitting SR, for example, based on the amount of time between SR resources configured at the WTRU (e.g., in combination with QoS properties of the data triggering the SR). In examples, a WTRU may prioritize UL transmissions including SL SR, for example, if the next SL SR resource may not be transmitted within a number of slots. A WTRU may prioritize UL transmissions including an SL SR, for example, if the next SL SR resource that may be transmitted to the network (e.g., which may be associated with the SL data that triggered the SR) may not be transmitted to the network within the next N slots, where N may depend on QoS properties (e.g., latency, reliability) of the SL data that triggered the SR.

Conditions for link prioritization may include a transmission including a BSR (e.g., SL or UL). A WTRU may prioritize a UL, for example, if the UL transmission includes an SL BSR or a UL BSR. A WTRU may prioritize a UL, for example, if the UL transmission includes a type of SL BSR (e.g., a specific type). The type of SL BSR may include, for example, (e.g., only) a non-padding BSR. A WTRU may prioritize a UL, for example, if the UL transmission includes an SL or UL BSR. A WTRU may prioritize a UL, for example, if the UL transmission includes an SL or a UL BSR, e.g., where the reported LCH priority may satisfy one or more conditions. The conditions may include, for example, one or more of the following: the highest priority LCH reported in the BSR may be higher than the SL transmission priority; and/or the highest priority LCH reported in the BSR may be higher than an (e.g., a (pre) configured or selected) offset from the SL transmission priority.

Conditions for link prioritization may include a transmission with a control message of a type (e.g., a specific type), for example, depending on WTRU state. A WTRU may prioritize a UL or an SL, for example, if the transmission includes a medium access control (MAC) control element (CE) or RRC message (e.g., of a specific type). A WTRU may prioritize an SL/UL, for example, if it includes an SL/UL MAC CE or an SL/UL RRC message. A MAC CE/RRC may be associated with a function of, for example, one or more of the following: SL/UL power control, SL/UL CSI measurements, SL/UL radiolink monitoring (RLM)/radiolink failure (RLF), SL resource allocation, SL/UL configuration, and/or SL/UL measurement reporting. In examples, a WTRU may prioritize an SL/UL for a MAC CE/radio resource control (RRC) message, for example, depending on the state of the WTRU. A transmission may be used to avoid a state, and/or to transition out of a state. In examples, a WTRU may prioritize an SL RRC message, for example, during an SL link establishment phase; prioritize an SL RRC message, for example, if the WTRU has an active SL unicast link; prioritize a UL control message, for example, if the WTRU experiences a beam failure; prioritize an SL RRC/MAC CE, for example, if the WTRU needs or uses a different configuration for SL HARQ feedback resources; prioritize a UL RRC message, for example, if it reports an MCG/SCG failure message; prioritize a UL indication (e.g. by an RRC message), for example, when detecting an SL RLF.

Conditions for link prioritization may include a redundancy version (RV) associated with a HARQ-based transmission. A WTRU may associate a different priority level with, or may prioritize UL or SL based on, a (e.g., specific) redundancy version associated with a HARQ based transmission. In examples, a WTRU may prioritize retransmissions over initial transmissions. A WTRU may prioritize an SL, for example, if the SL includes a HARQ retransmission with an RV>N. N may be (pre)configured. A WTRU may prioritize SL or UL, for example, based on a comparison of the SL and UL RV. A WTRU may prioritize SL, for example, if an SL RV is larger than a UL RV. A WTRU may add an offset in the priority, e.g., based on the redundancy version or retransmission number, for example, when performing comparison of UL/SL priority. A WTRU may add an offset in a priority (e.g., associated with the LCH priority or any priority-based metric) based on a redundancy version or retransmission number, for example, when performing comparison of UL/SL priority based on LCH priority or any priority-based metric. An offset may be (pre)configured for a (e.g., each) redundancy version and/or retransmission number. An offset may be a (e.g., predefined) function of a redundancy version and/or retransmission number.

Conditions for link prioritization may include blind vs HARQ-based retransmission. A WTRU may prioritize retransmissions on SL differently, for example, depending on whether the retransmissions are HARQ feedback-based retransmissions or blind retransmissions. A WTRU may prioritize SL retransmission over an UL (re)transmission, for example, when the SL retransmission is generated as a result of reception of a feedback-based indication, such as not acknowledged (NACK). A WTRU may not prioritize an SL retransmission, for example, if the retransmission is associated with a blind retransmission.

Conditions for link prioritization may include unsuccessful/dropped transmission of previous transmissions of a (e.g., the same) TB. A WTRU may prioritize retransmissions on SL/UL over (re)transmissions on UL/SL, for example, if previous (re)transmissions on SL/UL were unsuccessful (e.g., due to dropping of the transmission). A WTRU may prioritize a retransmission on SL over a transmission on UL, for example, if the previous transmission on SL of the same TB was dropped because the UL was prioritized. A WTRU may prioritize a retransmission on SL, for example, to enable that at least N SL transmissions of a (e.g., the same) TB are performed (e.g., without being dropped due to prioritization of UL).

Conditions for link prioritization may include range requirements (e.g., MCR) of SL data. A WTRU may prioritize transmissions on UL, for example, if the SL transmissions are associated with transmissions and/or feedback where the MCR is exceeded. A WTRU may prioritize UL transmissions, for example, if the SL transmission includes one or more of the following: data transmissions, SL HARQ feedback, CQI feedback, RS transmissions, etc. The associated data may have an MCR. An MCR may be smaller than the distance between the peer WTRUs.

Conditions for link prioritization may include a resource allocation mode that may be associated with SL transmission. A WTRU may prioritize transmissions on SL (e.g., relative to UL), for example, depending on the resource allocation mode associated with the SL transmission. For example, a WTRU may prioritize SL transmissions associated with a forward booked (e.g., reserved) resource (e.g., while not prioritizing SL transmissions where forward booking (reservation) was not performed). A WTRU may prioritize SL transmission for which LBT was performed (e.g., while not prioritizing SL transmissions where LBT was not performed).

Different priority levels may be used. Different priority levels may be associated with different conditions. A WTRU may determine a priority level associated with different transmissions, for example, based on one or more (e.g., a combination of) conditions (e.g., described herein). For example, a WTRU may determine any finite number of priority levels (e.g., P1, P2, P3, . . . ). A WTRU may associate a priority level with a (e.g., each) transmission. A transmission may be defined by any condition(s) (e.g., as described herein), for example, where P1>P2>P3, etc. A WTRU may associate a priority level for data (e.g., data-only) transmission, for example, based on approaches described herein. A WTRU may be configured with a priority level for non-data based transmissions (e.g., as described herein), for example, based on (pre)configuration. A WTRU may compare a priority of data-based and non-data based transmissions, for example, based on priority levels assigned to a (e.g., each) transmission. A WTRU may, for example, determine a priority level associated with a UL transmission or an SL transmission (e.g., including data and non-data transmissions) as the priority level associated with the highest priority transmission. For example, the prioritization value associated with an SL LCG is determined using a prioritization value of the highest priority among one or more LCHs that comprise SL data and belong to the SL LCG. The prioritization value associated with the UL LCG is determined using a prioritization value of the highest priority among one or more LCHs that comprise UL data and belong to the UL LCG. A WTRU may prioritize UL or SL, for example, depending on which has the higher (e.g., highest) derived priority level. A SL LCG may include a logical channel(s) that includes SL data. An UL LCG may include a logical channel(s) that includes UL data.

Different rules may be used, for example, depending on which condition(s) is/are satisfied. A WTRU may use a first condition or rule for prioritization, for example, if and/or when a first condition or combination of conditions is satisfied. A WTRU may use a second rule for prioritization, for example, if and/or when a second condition or combination of conditions is satisfied. The rules and/or conditions used may be one or more (e.g., a combination of) rules and/or conditions described herein. In examples, a WTRU may prioritize UL transmission, for example, if the UL includes a non-padding BSR. A WTRU may prioritize UL transmission, for example, if the UL includes a non-padding BSR for which the highest priority LCH reported in the BSR is higher than the priority of any LCH associated with the SL data. The WTRU may prioritize between SL and UL transmissions based on comparison of UL/SL logical channels (e.g., as described herein), for example, if the condition is not satisfied (e.g., the BSR does not include a LCH of higher priority than the LCH(s) associated with the SL). A WTRU may determine whether to prioritize UL vs SL transmission (e.g., by comparing the RV associated with the transmission), for example, if any of the transmissions are associated with a retransmission. The WTRU may prioritize the UL or SL based on comparison of the UL vs SL LCH priorities, for example, if the transmissions are not associated with a retransmission and/or if SL and UL transmissions are associated with initial transmission.

Tie-breaker or tiered priority rules may be used to determine priorities. A WTRU may define (e.g., create, select, and/or configure) a rule for prioritizing UL vs SL, for example, if UL and SL have or are defined to have equal priority. A WTRU may (e.g., if UL and SL have equal priority), for example, do one or more of the following: transmit (e.g., always transmit) on UL; transmit (e.g., always transmit) on SL; transmit on UL or SL, for example, depending on which direction has the largest amount of data being transmitted; transmit on UL, for example, if the previous collision yielded a transmission on SL (or vice versa); and/or transmit on UL/SL, for example, if the previous slot was a UL/SL transmission.

A WTRU may inform a network (NW) that a UL transmission was dropped. In examples, a WTRU may inform a network following a decision to prioritize SL transmissions. A WTRU may inform a network with a transmission in the same slot (e.g. multiplexed in the same slot as SL transmissions, for example, using one or more approaches described herein). A WTRU may inform a network at a time following a UL transmission that was dropped. A WTRU may send an indication using, for example, one or more of the following: a dedicated UCI transmission, an SR transmission, a BSR transmission, a dedicated MAC CE, and/or the like.

A WTRU may send an indication using a dedicated UCI transmission. A (e.g., reserved) physical random access channel (PRACH) resource may be used by a WTRU to send an indication. A contention-based or contention-free PRACH resource may be reserved. A WTRU may send an indication via a reserved PRACH resource. In examples, a contention-based or contention-free PRACH resource may be reserved, and a WTRU may send an indication via the reserved PRACH resource, for example, when an event occurs. An example of the event may include, for example, a UL transmission is dropped due to SL transmission. A (e.g., reserved) physical uplink control channel (PUCCH) resource may (e.g., additionally and/or alternatively) be used by a WTRU to send an indication.

A WTRU may send an indication using an SR transmission. A WTRU may trigger an SR, for example, following a decision to prioritize SL transmissions. A WTRU may use a dedicated SR configuration, for example, for indicating that an UL transmission was dropped. A WTRU may trigger an SR associated with the same parameters as the UL grant. The UL grant may be dropped, for example, to signal a dropped UL transmission. A WTRU may trigger an SR on the same slot and/or a slot related to the UL grant.

A WTRU may send an indication using a BSR transmission. A WTRU may trigger a BSR transmission, for example, following decision to prioritize the SL transmission.

A WTRU may send an indication using dedicated MAC CE. For example, a WTRU may transmit a dedicated MAC CE. A MAC CE may indicate the timing of a UL transmission dropped by the WTRU.

A WTRU may inform a network that the WTRU prioritizes SL transmissions under (e.g., based on) certain conditions. The conditions may include, for example, one or more of the following: the WTRU may be (pre)configured to provide an indication; a UL transmission may be associated with data (e.g., including data of (pre)configured LCHs or LCH priorities); a DL cell quality may be above/below a threshold; a gNB may have increased a PDCCH aggregation level, for example, for requesting retransmission of the dropped UL transmission. For example, a first UL grant may be dropped due to SL prioritization. The first UL grant may be received with a PDCCH with aggregation level x1. The gNB may send a second UL grant for the same transport block, for example, after dropping of the first UL grant. The WTRU may send the indication, for example, if the second UL grant is received with a PDCCH with aggregation level x2, and if x2>x1. The WTRU may (e.g., alternatively) send the indication, for example, if x2-x1> threshold.

Priority metric(s) of different links may be derived based on data characteristics. A WTRU may compare the priorities of UL/SL logical channels. In examples, a WTRU may determine which transmission to prioritize, for example, based on the configured priorities of the logical channels associated with a (e.g., each) transmission. A WTRU may compare the priorities of the (pre)configured logical channels multiplexed into a (e.g., each) transmission. The (pre) configured logical channels may be sidelink or uplink, e.g., as appropriate. A WTRU may prioritize the transmission with the higher (e.g., highest) LCH priority. An LCH priority may be determined, for example, by one or more of the following: the WTRU may select the UL or SL transmission that includes a relatively high (e.g., the highest) LCH priority; and/or the WTRU may compare weighted sum of LCH priorities. The WTRU may select the UL or SL transmission where a calculated priority is relatively high (e.g., highest). The calculated priority for a transmission may be a function of the priorities of a (e.g., each) logical channel multiplexed into that transmission (e.g., a sum or weighted sum). For example, a WTRU may compute a weighted average of the priorities of some (e.g., each) of the logical channels multiplexed into a transmission and/or may compare the weighted average of the UL transmission with the weighted average of the SL transmission. The WTRU may prioritize the transmission having the highest calculated priority. Weighting may be based on data size. For example, the WTRU may weight the priority with the size of the data included for a (e.g., each) logical channel. Weighting may be based on satisfying prioritized bit rate (PBR). For example, the WTRU may weight the priority with the prioritized bit rate (e.g., determined during a logical channel prioritization (LCP) procedure for each logical channel). In examples, a logical channel may be given a larger weight, for example, if the data included in the transmission is used to meet the PBR for the execution of an LCP procedure. A logical channel may be given less weight, for example, if it includes predominantly data (e.g., predominantly data used during step 3 of LCP). For example, in step 3 of LCP, a WTRU may include as much data as available in the buffers into the grant (e.g., even if the data exceeds the prioritized bit rate). The WTRU may include as much data as available in the buffers into the grant by starting with the highest priority logical channel and moving to the next highest, etc. for example, until the grant is filled. A WTRU may (e.g., alternatively) prioritize a transmission that includes a large (e.g., the largest) amount or percentage of data included to satisfy the PBR.

A WTRU may perform a weighted average of LCHs (e.g., only the LCHs that have priority above a (pre)configured threshold), for example, as described herein.

A WTRU may count the number of logical channels (e.g., having priority above a (pre)configured threshold). The WTRU may select the transmission with a large (e.g., the largest) number of logical channels (e.g., having priority above a (pre)configured threshold).

A WTRU may offset SL priority, for example, based on sidelink measurements or QoS. In an example, which may be used in conjunction with other examples (e.g., as described herein), a WTRU may consider SL related measurements and/or SL QoS properties (e.g., in addition to LCH priority) to determine whether to prioritize UL or SL transmission. Offsetting SL priority and considering SL related measurements and/or SL QoS properties may be implemented, for example, because realization of QoS for SL may be based on factors controlled and/or observed at a WTRU (e.g. resource selection compared to packet delay budget (PDB), channel busy ratio (CBR), etc.), the factors may or may not be known to the gNB, and direct comparison of NW configure SL and UL LCH priorities may or may not be sufficient.

An offset to the calculated priority (e.g., described herein) may be included, for example, in an implementation that considers other factors (e.g., aside from logical channel priority). For example, a WTRU may compute an offset, which may be applied to the SL priority metric. A WTRU may compare the resulting UL and SL priorities (e.g., after application of the offset) to determine which transmission (e.g., UL/SL) is prioritized. A WTRU may compute the offset, for example, based on one or more (e.g., a combination) of the following: measured channel occupancy; PDB or remaining PDB associated with the sidelink transmission; and/or presence of another SL process/grant at the WTRU that may be used to transmit the dropped SL transmission.

A WTRU may compute an offset based on a measured channel occupancy. A WTRU may be configured with a different offset to apply to the SL priority, for example, based on the measured channel occupancy. Measured channel occupancy may be determined by one or more of a CBR, a number of occupied resources determined by sensing, etc. A WTRU may apply a different offset for a higher CBR, e.g., to prioritize SL transmissions. For example, a WTRU may apply a larger offset for a higher CBR to prioritize SL transmissions.

A WTRU may compute an offset based on PDB or remaining PDB associated with a sidelink transmission. For example, a WTRU may apply an offset related to a latency requirement associated with a packet and/or an SL logical channel. For example, a WTRU may apply an offset related to a remaining latency budget. The remaining latency budget may include the time between the transmission and the latency budget associated with the packet and/or logical channel.

A WTRU may compute an offset based on the presence of another SL process/grant at the WTRU that may be used to transmit the dropped SL transmission. For example, a WTRU may apply an offset related to the presence of another SL grant/process at the WTRU. An offset may meet the latency requirements of the SL transmission in question. A WTRU may be configured with an offset such that UL is favored, for example, if additional SL grants meet the latency requirement associated with the SL transmission.

A WTRU may compare SL transmission priority with priority signaled in a UL grant. In an example, a WTRU may be provided with a UL grant priority to be used in a UL/SL prioritization decision. For example, a WTRU may be provided with a priority in the UL grant. A WTRU may compare a derived priority level of an SL transmission (e.g., as determined herein) with a UL grant priority. A WTRU may prioritize UL or SL, for example, depending on which transmission has the higher (e.g., highest) priority.

A WTRU may prioritize UL or SL, for example, based on a configuration of thresholds. In examples, a WTRU may prioritize UL or SL based on configuration of UL and SL thresholds.

In examples, a WTRU may be configured with an SL threshold and/or a UL threshold. An SL threshold may be, for example, in terms of LCH priority and/or or a QoS parameter related to SL. A UL threshold may be, for example, in terms of LCH priority and/or a QoS parameter related to UL.

A WTRU may compare UL priority or SL priority with a corresponding threshold. In an example, a WTRU may compare a UL priority with a configured UL threshold. A WTRU may compare an SL priority with a configured SL threshold. A WTRU may make a determination, for example, based on which of the SL or UL transmissions is below the corresponding threshold. A WTRU may make a determination based on which of the SL or UL transmissions is above a corresponding threshold.

A WTRU may prioritize UL transmission. A WTRU may prioritize a UL transmission, for example, if the UL transmission is above the UL threshold and the SL transmission is below the SL threshold.

A WTRU may prioritize an SL transmission. A WTRU may prioritize a SL transmission, for example, if the SL transmission is above the SL threshold and the UL transmission is below the UL threshold.

A WTRU may prioritize a UL transmission or an SL transmission. In examples, a WTRU may prioritize a UL transmission, for example, if the UL transmission and the SL transmission are below the corresponding threshold. A WTRU may prioritize an SL transmission, for example, if a UL transmission and an SL transmission are below a corresponding threshold. A decision may be (pre)configured, or may be determined, for example, based on any other rules (e.g., as may be defined herein, such as the WTRU may prioritize UL if CBR is above a threshold). In examples, a WTRU may prioritize a UL transmission, for example, if a UL transmission and an SL transmission are above a corresponding threshold. A WTRU may prioritize an SL transmission, for example, if a UL transmission and an SL transmission are above the corresponding threshold. A decision may be (pre)configured, or may be determined, for example, based on any other rules (e.g., as may be defined herein, such as the WTRU may prioritize UL if CBR is above a threshold).

A WTRU may inform a network about a dropped transmission(s) based on a condition. In an example, a WTRU may inform the network about a dropped transmission, for example, based on a condition that the respective thresholds in both the UL and SL are exceeded. A condition may be associated with the priority of the data with respect to the threshold(s). A WTRU may inform the network that it is dropping one of the transmissions, for example, in some conditions associated with the priority of the data with respect to a (e.g., each) threshold. In examples, a WTRU may select a UL transmission and inform the network that the SL transmission is dropped, for example, if the priority of the UL transmission is above the threshold and the priority of the SL transmission is above the threshold. A WTRU may select the SL transmission and inform the network that the UL transmission is dropped, for example, if the priority of the UL transmission is above the threshold and the priority of the SL transmission is above the threshold.

A WTRU may trigger an SR based on a condition. In examples, a WTRU may trigger one or more SRs, for example, based on a condition that the respective thresholds in both the UL and SL are exceeded. A condition may be associated with the priority of the data with respect to the threshold(s). A WTRU may request additional resources, for example, by triggering the SR(s), for example, in some conditions associated with the priority of the data with respect to a (e.g., each) threshold. In examples, a WTRU may trigger a UL SR, for example, if the WTRU elects to prioritize an SL transmission and a UL transmission has priority above a threshold. A WTRU may trigger an SL SR, for example, if the WTRU elects to prioritize a UL transmission and an SL transmission has priority above a threshold.

A WTRU may perform resource reselection. A WTRU may perform resource reselection, for example, if SL is dropped, for example, due to prioritization rules.

A WTRU may determine which link to prioritize (e.g., UL or SL) based on multiple thresholds (an SL prioritization threshold and/or a UL prioritization threshold). The SL prioritization threshold may be used on a condition that the SL prioritization threshold is configured. The UL prioritization threshold may be used on a condition that the UL prioritization threshold is configured. For example, there may be tiered priority rules, where, for example, a WTRU evaluates a first criteria (e.g., whether a prioritization value associated with a SL LCG is lower than the SL prioritization threshold, as shown in 304 of FIG. 3), then a second criteria (e.g., whether at least whether a UL LCG has a prioritization value that is equal to or higher than the UL prioritization threshold, as shown in 306 of FIG. 3, and whether the UL prioritization threshold is configured), then a third criteria (e.g., a size of a UL grant and the determination of whether to prioritize the SL LCG), etc. A WTRU may prioritize the UL or SL, for example, depending on which of the criteria is/are satisfied. Tiered criteria may have an order or precedence. In an example, if the first tier criteria is satisfied then the WTRU may not need to check the second, third, etc.

In an example, a WTRU may determine which link to prioritize (e.g., UL or SL), for example, based on whether the priority of transmissions on a first link are above a first threshold. A WTRU may determine which link to prioritize based on comparison of the priority of a second link with a second threshold, for example if a condition is not met (e.g., a first link's transmissions are not higher priority than the first threshold). A first threshold may be a QoS related or priority related threshold, for example, associated with a first link's transmissions. A QoS related or priority related first threshold may include, for example, one or more of PPPP, PPPR, LCH priority, 5QI, PQI, and/or the like. A second threshold may be a QoS related or priority related threshold, for example, associated with a second link's transmissions. A QoS related or priority related second threshold may include, for example, PPPP, PPPR, LCH priority, 5QI, PQI, and/or the like. A first threshold and a second threshold may be based on different QoS or priority related parameters. For example, UL may use LCH priority, and SL may use PPPP. WTRU determination of a first link priority and a second link priority may be based on different QoS or priority related parameters. For example, UL may use LCH priority, and SL may use PPPP.

A threshold may not be configured. A WTRU may be configured to determine which link to prioritize based on another, configured threshold. In an example, a WTRU may be configured to determine which link to prioritize based on a second threshold, for example, (e.g., only) if a first threshold is not configured at the WTRU. A WTRU may assume a threshold associated with a link is not configured, for example, based on the RAT of the link. A WTRU may determine the link to prioritize based on a second threshold, for example, if the WTRU assumes a first threshold is not configured based on the RAT of the link. A WTRU's transmission may include, for example, one or more of a data transmission, a control transmission, a WTRU assistance transmission, a WTRU feedback transmission, and/or the like. A control transmission, WTRU assistance transmission, and/or WTRU feedback transmission may include, for example, one or more of MAC CE, SR, PUCCH, PSFCH, and/or the like. In an example associated with a WTRU's data transmission, a WTRU may determine the priority of a transmission based on the priority of the data (e.g. highest priority LCH multiplexed into a MAC PDU). In an example associated with WTRU assistance, a WTRU may associate the priority of a transmission with the associated data transmission, for example, as described herein.

A WTRU may determine prioritization related to data for a first RAT UL and a first RAT SL. A first RAT may include NR. In an example, a WTRU may be configured with a UL LCH threshold and an SL LCH threshold. A WTRU may compare a UL transmission with a UL LCH threshold. A WTRU may prioritize UL over SL, for example, if the highest priority LCH multiplexed into the UL MAC PDU is a higher priority than the UL LCH threshold. A WTRU may check transmission priority, for example, if the highest priority LCH multiplexed into the UL MAC PDU is not a higher priority than the UL LCH threshold. A WTRU may compare an SL transmission with an SL LCH threshold. A WTRU may prioritize SL over UL, for example, if the highest priority SL LCH multiplexed into the SL PDU is higher priority than the SL LCH threshold. For example, the WTRU may prioritize an SL LCG (e.g., over UL LCG) if a prioritization value associated with the SL LCG is lower than the SL prioritization threshold and each UL LCG has a prioritization value that is equal to or higher than the UL prioritization threshold. The prioritization value associated with the SL LCG may be indicated by the prioritization value of the highest priority LCH of the SL LCG. A WTRU may prioritize UL over SL, for example, if the highest priority SL LCH multiplexed into the SL PDU is not higher priority than the SL LCH threshold. The WTRU may prioritize an UL LCG (e.g., over SL LCG) if a prioritization value associated with at least one (e.g., each) SL LCG is equal to or higher than the SL prioritization threshold. The WTRU may prioritize the SL LCG in response to a determination that a prioritization value associated with the SL LCG is lower than the SL prioritization threshold and that the UL prioritization threshold is not configured.

A WTRU may determine prioritization involving UL BSR/SR for a first RAT UL and a first RAT SL. A WTRU may determine the priority of a UL BSR/SR, for example, based on the priority associated with LCH being reported in the BSR. A WTRU may determine the priority of an UL BSR/SR (relative to a configured UL threshold), for example, based on the highest priority LCH being reported in the BSR, and may apply one or more rules (e.g., as provided herein). A WTRU may determine the priority of a UL BSR/SR, for example, based on the LCH that triggered the SR. A WTRU may determine the priority of a UL BSR/SR (e.g., relative to a configured UL threshold), for example, based on the highest priority LCH that triggered the SR, and may apply one or more rules (e.g., as provided herein). A WTRU may prioritize a UL transmission, for example, if the highest priority UL LCH reported in the UL BSR (e.g., or for which the WTRU triggered SR) is higher priority than the UL LCH threshold. A WTRU may prioritize UL over SL, for example, if the highest priority LCH multiplexed into a UL MAC PDU is a higher priority than the UL LCH threshold. A WTRU may check transmission priority, for example, if the highest priority LCH multiplexed into the UL MAC PDU is not higher priority than the UL LCH threshold. A WTRU may prioritize SL over UL, for example, if the highest priority SL LCH multiplexed into the SL PDU is a higher priority than an SL LCH threshold and, otherwise, the WTRU may prioritize UL over SL.

A WTRU may determine prioritization involving SL SR/BSR for a first RAT UL and a first RAT SL. A WTRU may determine the priority of an SL BSR/SR, for example, based on the priority of LCH being reported in the BSR. A WTRU may determine the priority of an SL BSR/SR, for example, based on the highest priority LCH being reported in the BSR, and may compare the priority with SL data priority in an SL transmission (e.g., instead of comparing the priority with a threshold). A WTRU may determine the priority of an SL BSR/SR, for example, based on the LCH that triggered the SR. A WTRU may determine the priority of an SL BSR/SR, for example, based on the highest priority LCH that triggered the SR, and may compare the priority with SL data priority in an SL transmission. The priority may be associated with the same link (e.g., prioritization with a threshold may not be used). A WTRU may prioritize a UL transmission, for example, if the highest priority SL LCH reported in the SL BSR (e.g., or for which the WTRU triggered SL SR) is a higher priority than the highest priority SL LCH threshold multiplexed into the SL MAC PDU and, otherwise, the WTRU may prioritize SL transmissions. One or more examples herein may be applicable to NR/LTE UL/SL prioritization and LTE/NR UL/SL prioritization.

A WTRU may determine a prioritization related to data for a first RAT UL and a second RAT SL. A second RAT may include LTE. For example, UL may be in NR and SL may be in LTE. A WTRU may determine a prioritization related to data for a first RAT UL and a second RAT SL (e.g., or a second RAT UL/a first RAT SL), for example, based on an LCH threshold and/or a PPPP threshold. In examples, a WTRU may be configured with a UL LCH threshold and an SL PPPP threshold. A WTRU may compare a UL transmission with a UL LCH threshold. A WTRU may prioritize UL over SL, for example, if the highest priority LCH multiplexed into the UL MAC PDU is higher priority than the UL LCH threshold. A WTRU may check SL transmission priority, for example, if the highest priority LCH multiplexed into the UL MAC PDU is not higher priority than the UL LCH threshold. A WTRU may prioritize SL over UL, for example, if the highest priority SL PPPP multiplexed into the SL PDU is higher priority than the SL PPPP threshold, and otherwise, the WTRU may prioritize UL over SL.

A WTRU may determine a prioritization related to data for a second RAT UL and a first RAT SL. For example, UL may be in LTE and SL may be in NR. In some examples, a WTRU may be configured with (e.g., only) an SL LCH threshold. A WTRU may recognize that the WTRU does not (e.g., need to) use the UL LCH threshold based on the RAT associated with UL (e.g., LTE). A WTRU may check SL transmission priority. A WTRU may prioritize SL over UL, for example, if the highest priority SL LCH multiplexed into the SL PDU is higher priority than the SL LCH threshold, and otherwise, the WTRU may prioritize UL over SL.

A WTRU may determine a prioritization related to UL SR/BSR for a first RAT UL and a second RAT SL. A WTRU may determine a prioritization related to UL SR/BSR for a first RAT UL and a second RAT SL, for example, based on LCH threshold and/or PPPP threshold. In some examples, a WTRU may be configured with a UL LCH threshold and an SL PPPP threshold. A WTRU may compare a UL transmission with a UL LCH threshold. A WTRU may prioritize UL over SL, for example, if the highest priority LCH reported in a UL BSR (e.g., or that triggered a UL SR) has higher priority than the UL LCH threshold. A WTRU may check SL transmission priority, for example, if the highest priority LCH reported in UL BSR (e.g., or that triggered UL SR) does not have higher priority than the UL LCH threshold, for example, as indicated by a prioritization value equal to or higher than the UL LCH threshold. A WTRU may prioritize SL over UL, for example, if the highest priority SL PPPP multiplexed into the SL PDU is higher priority than the SL PPPP threshold, and otherwise, the WTRU may prioritize UL over SL.

One or more examples herein may be combined, for example, in terms of which condition or type of transmission is checked first, or which example is applicable due to the presence or lack of data and/or BSR in UL.

A WTRU may prioritize a UL or an SL, for example, based on validity of a threshold. A WTRU may prioritize UL or SL, for example, based on selection of which threshold (e.g., UL or SL) is valid. A WTRU may use a comparison of the priority of a link (e.g., SL or UL) with a corresponding threshold. A determination of the link may be based on, for example, one or more of the following factors: CBR, CR, pathloss of a UL and/or an SL, and/or the like. The determination of a link may be based on CBR. A WTRU may use a comparison of a UL or an SL, for example, depending on whether a CBR is above/below a threshold. A WTRU may use a comparison of a UL, for example, if the CBR is above a threshold. A WTRU may use a comparison of an SL, for example, if the CBR is below a threshold. A determination of a link may be based on a CR. A WTRU may use a comparison of a UL or an SL, for example, depending on whether the CR is above/below a threshold. A WTRU may use comparison of a UL, for example, if the CR is above a threshold. A WTRU may use a comparison of an SL, for example, if the CR is below a threshold. A determination of a link may be based on a pathloss of a UL and/or an SL. A WTRU may use a comparison of a UL or an SL, for example, depending on the measured pathloss of the UL or SL. A WTRU may prioritize a UL, for example, if the pathloss of the UL is above a threshold. A WTRU may prioritize an SL, for example, if the pathloss of the SL is above a threshold. One or more other factors (e.g., as described herein) may be used for selecting which threshold to utilize.

Figure 3:
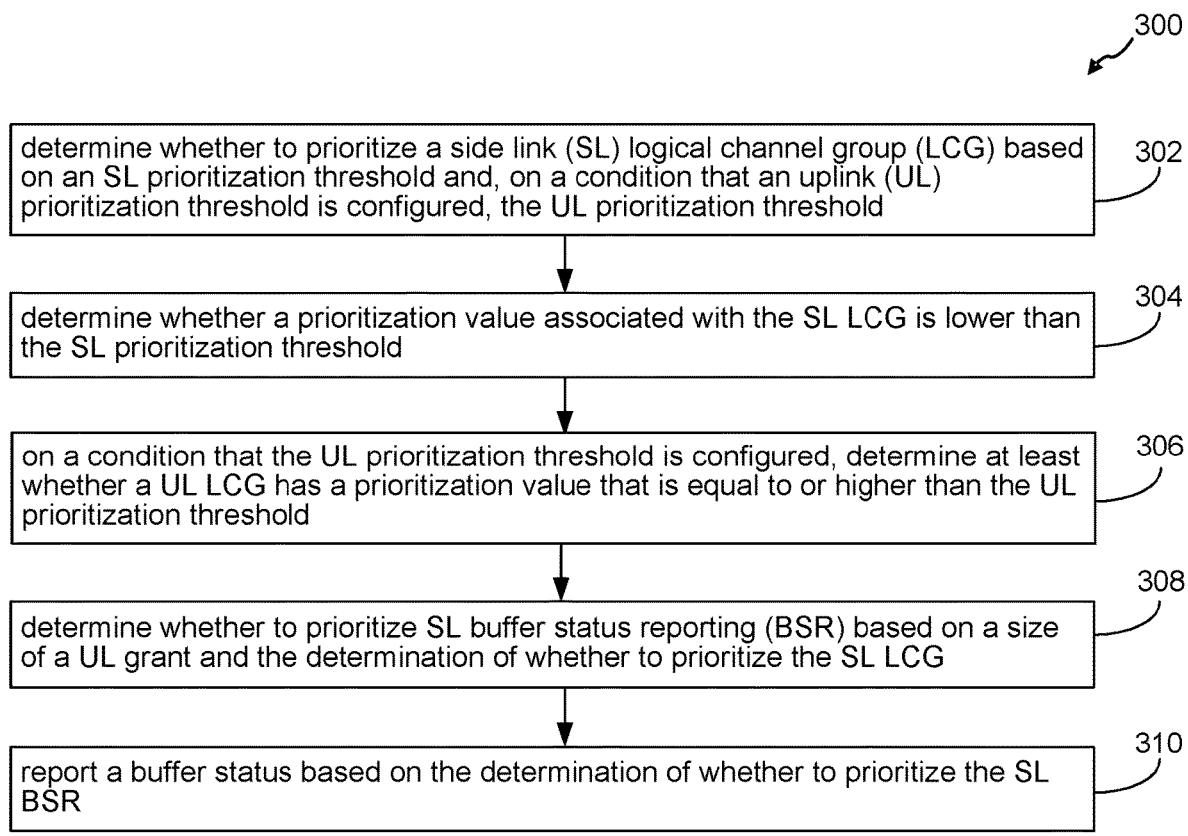
FIG. 3 illustrates an example of performing uplink and sidelink operation with prioritization.

One or more examples herein may be used in association with a BSR for UL and/or SL. A buffer status may be reported based on the determination of whether to prioritize the SL BLR. Prioritization of a UL BSR or an SL BSR may be based on priorities of LCGs. A WTRU may prioritize between a UL BSR and an SL BSR, for example, based on priorities of the LCGs associated with the UL BSR and priorities of the LCGs associated with the SL BSR. For example, as shown in FIG. 3, in 302, a determination may be made whether to prioritize an SL LCG based on an SL prioritization threshold and, on a condition that a UL prioritization threshold is configured, the UL prioritization threshold. In 304, a determination may be made whether a prioritization value associated with the SL LCG is lower than the SL prioritization threshold. In 306, on a condition that the UL prioritization threshold is configured, a determination may be made to determine at least whether a UL LCG has a prioritization value that is equal to or higher than the UL prioritization threshold. In 308, the determination of whether to prioritize the SL LCG (or the UL LCG) may be used to determine whether to prioritize an SL BSR (or UL BSR).

A WTRU may determine whether to prioritize a UL BSR or an SL BSR, for example, based on the priority of data being reported in BSR. A WTRU may determine whether to include UL BSR or SL BSR first in the LCP procedure, for example, based on the priority of the data being reported in the corresponding BSR.

A WTRU may determine whether to prioritize a UL BSR or an SL BSR, for example, based on LCGs of high (e.g., the highest) priority. The prioritization value associated with an LCG may be determined based on the prioritization value of the highest priority LCH of the LCG. A WTRU may prioritize a UL BSR, for example, if the highest priority LCG of UL is higher than the highest priority LCG of SL. A WTRU may prioritize the SL BSR, for example, if the highest priority LCG of SL is higher than the highest priority LCG of UL. A WTRU may be (pre)configured with which link(s) to prioritize. The behavior (e.g., logic) of which link(s) to prioritize may be predetermined. A WTRU may be (pre)configured with a link (e.g., UL or SL) to prioritize, or the behavior of which link to prioritize may be predetermined, for example, if the highest priority LCG of SL and UL are the same LCG.

A WTRU may determine whether to prioritize a UL BSR or an SL BSR, for example, based on equivalency mapping. Equivalency mapping may indicate a relationship between one or more aspects of an SL transmission and one or more aspects of a UL transmission. In examples, a WTRU may be configured with an equivalency mapping between SL LCG and UL LCG. For example, an equivalency mapping may include SL LCG 2=UL LCG 4, etc. A WTRU may be configured with an equivalency mapping between SL LCH and UL LCH. An equivalency mapping may be (pre)configured (e.g., by RRC signaling). A WTRU may perform prioritization (e.g., as described herein), for example, by using the equivalency mapping to determine the higher priority between SL and UL based on the higher priority between LCG(s). A WTRU may perform prioritization (e.g., as described herein), for example, by using the equivalency mapping to determine the higher priority between SL and UL based on the higher priority between LCH(s).

A WTRU may determine whether to prioritize a UL BSR or an SL BSR, for example, based on LCGs of relatively low priority. In examples, a WTRU may prioritize a UL BSR, for example, if the lowest priority LCG of UL is higher than the lower priority LCG of SL. A WTRU may prioritize an SL BSR, for example, if the lowest priority LCG of SL is higher than the lower priority LCG of UL. In an example, a WTRU may select a link (e.g., SL or UL) that does not have the lowest priority LCG. A WTRU may be (pre)configured to select a link (e.g., similar to one or more examples herein). A WTRU may be (pre)configured to select a link, for example, if the SL and UL links have the same priority for the lowest LCG. A WTRU may be configured with an equivalency mapping between the LCGs of different links.

A WTRU may determine whether to prioritize UL BSR or SL BSR, for example, based on a weighted sum of the priorities of some LCGs to be reported in the corresponding BSR. In an example, a WTRU may compute a weighted sum of the priorities of the (e.g., all) LCGs to be reported in the corresponding BSR. The LCGs may include LCGs having data to be reported in the corresponding BSR. A WTRU may prioritize an SL or a UL, for example, based on the BSR having the highest weighted priority between UL and SL BSRs.

A WTRU may be configured with a threshold that may be used to determine whether to prioritize an SL BSR or a UL BSR. The SL BSR, if prioritized, is prioritized over the UL BSR. In an example, a WTRU may be configured with one or more thresholds associated with SL and/or UL (e.g., as shown in 402 of FIG. 4 and 302 of FIG. 3). For example, a WTRU may be configured with a threshold of an SL LCG. A WTRU may prioritize SL LCG over UL LCG, for example, if the SL BSR includes data associated with an LCG that is higher (e.g., priority) than the LCG threshold of SL. A WTRU may be configured with a threshold of a UL LCG. A WTRU may prioritize UL LCG over SL LCG, for example, if the UL BSR includes data associated with an LCG that is higher (e.g., priority) than the LCG threshold of UL. A WTRU may be configured with a threshold of a UL LCG and a threshold of an SL LCG. A UL BSR may be prioritized, for example, if the UL BSR includes data associated with an LCG that is higher in priority than the UL prioritization threshold, and the SL BSR does not include data that is higher priority than the SL LCG threshold. The converse scenario for SL may result in SL being prioritized. An SL BSR may be prioritized, for example, if the SL BSR includes data associated with an LCG that is higher in priority than the SL LCG threshold (e.g., indicated by a prioritization value that is lower than the SL LCG threshold, as shown in 304 of FIG. 3), and the UL BSR does not include data that is higher priority than the UL prioritization threshold (e.g., indicated by a prioritization value that is equal to or higher than the UL prioritization threshold, as shown in 306 of FIG. 3). For example, a WTRU may determine whether each UL LCG has a prioritization value that is equal to or higher than the UL prioritization threshold and determine whether to prioritize SL LCG (or UL LCG) based on whether each UL LCG has a prioritization value that is equal to or higher than the UL prioritization threshold. The determination of whether to prioritize SL BSR is based on whether to prioritize the SL LCG. A WTRU may be (pre) configured to prioritize a BSR, or may use another determination rule (e.g., as described herein), for example, if an SL BSR and a UL BSR include data above their respective thresholds.

One or more examples herein may be used in combination to determine whether to prioritize an SL BSR or a UL BSR. In an example, a WTRU may be configured to prioritize according to a first rule (e.g., based on an example described herein), and, if the first rule does not result in a selection, the WTRU may be configured to prioritize based on a second rule (e.g., according to another example described herein).

A WTRU may determine the type (e.g., prioritized or non-prioritized) and/or size of an SL BSR and/or a UL BSR. A WTRU may determine the type and/or size of an SL BSR and/or a UL BSR, for example, based on the relative priorities in the corresponding BSR. A WTRU may determine the type and/or size of an SL BSR and/or a UL BSR, for example, based on one or more of the following (e.g., as shown in 302 of FIG. 3 or 404 of FIG. 4): the LCGs to be reported in the SL BSR (e.g., as shown in 308 of FIG. 3); the LCHs to be reported in the UL BSR; the size of the grant used to transmit the BSR (e.g., as shown in 308 of FIG. 3); and/or the presence of additional UL grants available (e.g., which may meet the latency requirements associated with SL data). The additional UL grants may include configured grants.

A WTRU may be configured to prioritize a BSR (e.g., an SL BSR), for example, using a combination of conditions and/or rules (e.g., as disclosed herein). An SL BSR may be prioritized, for example, because an SL LCG is prioritized and because the size of a UL grant used to transmit the BSR may be insufficient for the prioritized SL LCG if the SL BSR is not prioritized.

A WTRU may be configured to determine whether to send a shortened or truncated BSR. A WTRU may truncate or shorten an SL BSR and/or a UL BSR. A WTRU may be configured to send a relatively short BSR format. A WTRU may not send a relatively long BSR format. In an example, a WTRU may send (e.g., only) the buffer status associated with the highest priority LCG. As shown in 310 of FIG. 3, a buffer status may be reported based on the determination of whether to prioritize the SL BSR. A WTRU may be configured to send a shortened or truncated BSR format. For example, a WTRU may use a shortened or truncated BSR to send (e.g., only) a buffer status associated with a subset of LCGs. A buffer status associated with a subset of LCGs may, for example, start with a highest priority and may have a decreasing priority order. In an example, the prioritized and truncated SL BSR may include a first SL LCG (e.g., priori- tized) and a second SL LCG (e.g., prioritized) when the size of the UL grant is sufficient for the first and the second SL LCG. As shown in 406 of FIG. 4, a buffer status may be reported based on the determination of whether to include an LCG in the buffer status report. Whether to include the LCG in the buffer status report may be determined based on a size of a UL grant, a priority associated with the LCG, the SL prioritization threshold, and, on a condition that an UL prioritization threshold is configured, the UL prioritization threshold, as shown in 404 of FIG. 4. If the size of the UL grant is sufficient for the (e.g., all) prioritized SL LCG(s), a buffer status report may include UL LCG(s), for example, in addition to the prioritized SL LCG(s). The size of the UL grant may be sufficient for the SL BSR (e.g., prioritized) and some UL LCGs associated with the UL BSR. The buffer status report may include the SL BSR (e.g., prioritized) and some UL LCGs associated with the UL BSR.

A WTRU may determine whether to send a shortened or truncated BSR, for example, based on whether a grant is large enough and/or whether additional UL grants are present. A WTRU may (e.g., first) determine whether to send a shortened or truncated BSR for SL and/or UL, for example, based on the grant size and/or the presence/absence of additional UL grants. A WTRU may utilize a non-truncated BSR for SL BSR and/or UL BSR, for example, if the grant is large enough. A WTRU may utilize a non-truncated BSR for SL BSR and UL BSR, for example, if the UL grant is large enough to include a non-truncated SL BSR and a non-truncated UL BSR (e.g., and other MAC CEs of higher priority than the SL BSR and/or UL BSR). The size of a UL grant used to transmit the BSR may be insufficient for at least one (e.g., all) prioritized SL LCG if the SL BSR is not prioritized. A WTRU may (e.g., make a determination to) send a shortened or truncated BSR for SL and/or UL, for example, if the size of the UL grant is insufficient. A WTRU may truncate the SL BSR (e.g., not prioritized), and the truncated BLR may include as many SL LCGs (e.g., even if not prioritized) as allowed by the size of the UL grant. For example, the truncated SL BSR may include a first SL LCG (e.g., not prioritized) and a second SL LCG (e.g., not prioritized), for example, if the size of the UL grant is sufficient for the first SL LCG and the second SL LCG. A WTRU may assume that it is to send a shortened or truncated BSR for SL and/or UL, for example, if the grant is not large enough to include a non-truncated SL BSR and a non-truncated UL BSR. A WTRU may (e.g., assume that it is to) send a shortened or truncated BSR for SL and/or UL, for example, if the grant is not large enough to send a non-truncated UL BSR and a non-truncated SL BSR, and any (e.g., zero or more) additional grants configured at the WTRU do not meet the timing requirements associated with buffered data to be reported with SL BSR.

A WTRU may be configured to determine which BSR to shorten or truncate. A WTRU may (e.g., if truncation of BSR is used) determine which of an SL BSR and/or a UL BSR to truncate/shorten and/or how to truncate/shorten the SL BSR and/or the UL BSR. In examples, a WTRU may truncate/shorten a BSR that is triggered later in time. A WTRU may determine whether to send a shortened BSR or a truncated long BSR, for example, depending on the amount of data in the grant (e.g., size of the UL grant). A WTRU may include a short BSR for a link having a BSR triggered later, for example, if the number of bits in the grant is insufficient (e.g., not enough). A WTRU may include a short BSR for a link having a BSR triggered later, for example, if the number of bits remaining in the grant (e.g., after inclusion of the BSR for the link triggered earlier in time (in addition to other higher priority MAC CEs)) is large enough to include (e.g., only) a short BSR. A WTRU may, for example, if otherwise, include as many LCGs as there is space for in a truncated/shortened BSR.

A WTRU may truncate/shorten a BSR based on a priority of LCH/LCGs and/or a configured LCH/LCG threshold. In examples, a WTRU may (e.g., decide to) truncate a UL and/or an SL BSR, for example, to send a buffer status associated with the highest priority logical channels. A WTRU may (e.g., decide to) truncate a UL and/or an SL BSR, for example, to send buffer status associated with the LCH/LCGs that are above an LCH/LCG threshold. In examples, a WTRU may (e.g., decide to) truncate an SL BSR or a UL BSR and send (e.g., only) the buffer status of the LCH/LCGs in SL/UL BSR that are above a configured LCH/LCG threshold. A WTRU may (e.g., decide to) perform a truncation, for example, using a prioritized link. A WTRU may (e.g., decide to) perform a truncation (e.g., based on the configured LCG/LCH threshold), for example, if a BSR is prioritized with respect to the other BSR. A WTRU may (e.g., decide to) perform a truncation (e.g., based on the configured LCG/LCH threshold), for example, (e.g., only) if the SL BSR is prioritized with respect to the UL BSR. A WTRU may (e.g., decide to) perform a truncation (e.g., based on the configured LCG/LCH threshold), for example, (e.g., only) if the UL BSR is prioritized with respect to the SL BSR. A WTRU may (e.g., decide to) perform a truncation for a link (e.g., only one link). A WTRU may perform a truncation (e.g., based on the configured LCG/LCH threshold), for example, if an SL is prioritized (e.g., but not when UL is prioritized). A WTRU may truncate a BSR, for example, based (e.g., only) on the remaining size of the UL grant for the BSR that is not prioritized (e.g., UL or SL).

A WTRU may send a shortened or truncated SL BSR, for example, to include as many SL LCGs in an SL BSR. A WTRU may send a shortened or truncated UL BSR, for example, to include as many UL LCGs in a UL BSR. A WTRU may send a shortened or truncated SL BSR and a shortened or truncated UL BSR, for example, to include as many SL or UL LCGs in the SL and UL BSR that are allowed based on the grant size. A WTRU may be configured to include the highest priority LCGs in SL and UL BSR, for example, to include LCGs in decreasing order of priority (e.g., considered across both UL and SL).

A WTRU may truncate/shorten a BSR for UL or SL, for example, if the corresponding BSR includes the highest priority LCG. A WTRU may truncate/shorten a BSR for UL, for example, if the corresponding BSR includes the highest priority LCG (e.g., across both SL and UL), and the remaining LCGs have a priority lower than any LCGs to be sent in SL BSR. A WTRU may shorten a BSR for SL, for example, if the corresponding BSR includes the highest priority LCG (e.g., across both SL and UL), and the remaining LCGs have a priority lower than any LCGs to be sent in UL BSR.

A WTRU may send a short BSR for SL, and may truncate SL BSR, for example, based on various conditions. A WTRU may (e.g., always) send a short BSR for SL, and may truncate an SL BSR, for example, as determined by including a buffer status of LCGs (e.g., in a decreasing order of priority).

A WTRU may send short BSR(s) for SL and UL. In an example, a WTRU may (e.g., always) send short BSR(s) for SL and UL.

A WTRU may send a non-truncated BSR in a link and a truncated/short BSR in another link. In examples, a WTRU may send a non-truncated BSR in SL and a truncate/short BSR in UL. A WTRU may select a link (e.g., SL or UL) on which to send a non-truncated BSR, for example, based on a priority of the LCGs to be reported in SL and UL. For example, the link (UL or SL) with the lowest priority LCG to be reported may be truncated/shortened.

A WTRU may be configured to perform prioritization between multiple (e.g., potential) SL transmissions (e.g., SL/SL prioritization). A WTRU may be configured to (e.g., attempt to) avoid collisions between different UL/SL transmissions (e.g., using various approaches). A WTRU may be configured to (e.g., attempt to) avoid collisions between different UL/SL transmissions, for example, using approaches that multiplex UL and SL transmissions.

A WTRU may perform transmission on UL and SL in the same resources (e.g., slot). In an example, a WTRU may be configured with conditions for performing transmission on SL and UL (e.g., without dropping and/or prioritizing SL/UL transmissions). A WTRU may perform transmission on UL and SL, for example, if conditions are met. A WTRU may perform prioritization between UL/S (e.g., as described herein), for example, if the conditions are not met. A WTRU may transmit UL and SL, for example, if SL transmissions include (e.g., only) PSFCH transmission(s). A WTRU may transmit UL and SL, for example, if UL transmissions include (e.g., only) SR transmission(s). A WTRU may transmit UL and SL, for example, if UL transmissions include (e.g., only) SRS transmission(s).

Various conditions for transmission on UL and SL may be used. For example, a WTRU may be configured with conditions permitting the WTRU to transmit on UL and SL in the same slot/TTI. Conditions to transmit a signal on UL and SL in the same resources (e.g., slot) may include, for example, one or more of the following: at least one symbol may be overlapped for UL and SL transmission in the resources; some (e.g., all) symbols of UL transmission may be overlapped with SL transmission; and/or symbols of UL transmission may not be overlapped with SL transmission.

Conditions may include or relate to, for example, one or more (e.g., a combination) of the following: NW indication, type of UL/SL transmission, duration (time) of the transmission on either UL or SL, QoS/priority associated with a transmission, carrier distance between UL and SL transmissions, frequency gap between UL and SL transmission, transmission power, power control scheme, and/or the like.

The conditions may be related to a network indication. A WTRU may receive an indication (e.g., from a network) indicating whether the WTRU may perform transmission on UL and SL in the same slot. An indication may be provided, for example, via an RRC configuration, or in a UL grant. An indication may be explicit (e.g., a bit in a UL grant from a network). An indication may be implicit. For example, a WTRU may (e.g., be allowed to) perform transmission on UL and SL in the same slot for certain values of a modulation and coding scheme (MCS) (e.g., configured by the network in a UL grant).

The conditions may be related to a type of UL/SL transmission. UL/SL transmission in the same slot may be allowed for certain (e.g., selected) types or combinations of UL and/or SL transmissions. UL/SL transmission in the same slot may not be allowed for other (e.g., unselected) types of UL/SL transmissions. The type of transmission may be related to one or more of the physical, transport, or logical channel associated with the UL/SL transmission. A WTRU may be allowed to transmit in the same slot in UL and SL, for example, if an SL transmission is associated with PSFCH (e.g., PSFCH only) transmission. A WTRU may be allowed to transmit in the same slot in UL and SL, for example, if the SL transmission is associated with PSFCH and/or the UL transmission is PUSCH. For example, a WTRU may be allowed to transmit in the same slot in UL and SL if the SL transmission is associated with PSFCH only and/or the UL transmission is PUSCH only (e.g., without a PUCCH transmission). A WTRU may be allowed to transmit in the same slot in UL and SL, for example, (e.g., only) if the UL transmission is associated with a certain (e.g., selected, indicated or configured) set of logical channels. A WTRU may be allowed to transmit in the same slot in UL and SL, for example, (e.g., only) if the UL transmission is not associated with a certain set of logical channels (e.g., configured by a network).

The conditions may be related to a duration (time) of a transmission on UL or SL. UL/SL transmission in the same slot may be allowed (e.g., and may occur), for example, if the UL/SL transmission duration is limited in time. UL/SL transmission in the same slot may be allowed (e.g., and may occur), for example, if the combination of the UL/SL transmission duration is limited in time. A WTRU may transmit on UL and SL, for example, if the SL transmission (e.g., PSFCH) is limited to (e.g., a maximum of) N symbols. N may depend on properties of the UL data (e.g., as described herein). A WTRU may transmit on UL and SL, for example, if the SL transmission (e.g., PSFCH) is limited to (e.g., a maximum of) N symbols and/or the UL transmission is limited to (e.g., a maximum of) M symbols. M may depend on properties of the SL data.

The conditions may be related to QoS/priority associated with a transmission. A WTRU may perform transmissions in the same slot on UL and SL, for example, based on the QoS and/or priority associated with the UL and/or SL transmissions. A WTRU may perform transmissions in the same slot on UL and SL, for example, if the PSFCH transmission on SL is associated with a data transmission of a certain QoS and/or priority. A WTRU may perform transmissions on the same slot in UL and SL, for example, if the UL transmissions are associated with eMBB. A WTRU may perform transmission on the same slot in UL and SL, for example, if the UL transmission includes logical channels (LCHs) having a priority below/above a certain threshold.

The conditions may be related to carrier distance between UL and SL transmissions. A WTRU may perform transmission in the same slot on UL and SL, for example, based on whether the UL and SL transmissions are on the same or different carriers, and/or based on the distance between the carriers in UL and SL. The condition may be combined with other conditions (e.g., as described herein). A WTRU may perform transmission on UL and SL in the same slot, for example, if the PSFCH is less than N slots, and if the PSFCH is less than M slots. A WTRU may perform transmission on UL and SL in the same slot, for example, if the PSFCH is less than N slots for the same carrier between UL and SL and if the PSFCH is less than M slots for different carriers between UL and SL.

The conditions may be related to a frequency gap between UL and SL transmission. A WTRU may perform transmission in the same slot on UL and SL, for example, depending on whether the frequency resources of UL and SL transmissions have a gap (e.g., larger than X RBs). The gap may be a frequency gap, for example, in terms of resource blocks. The X RBs may be predetermined, configured, or indicated (e.g., in downlink control information (DCI)).

The conditions may be related to transmission power. A WTRU may perform transmission in the same slot on UL and SL, for example, depending on whether the WTRU reached a certain transmission power (e.g., maximum transmission power). The maximum transmission power may include one or more of $P_{c,max}$, $P_{c,max,pssch}$, and/or the like. A WTRU may not perform UL and SL transmission in the same slot, for example, if a transmission (e.g., of UL and SL) would reach (e.g., or exceed) a maximum transmission power. A WTRU may perform transmission in the same slot on UL and SL, for example, if the UL and SL transmissions may not reach the maximum transmission power. A condition may be applied, for example, so that the total transmission of SL and UL may not reach a maximum transmission power of the WTRU.

The conditions may be related to a power control scheme. A WTRU may perform transmission in the same slot on UL and SL, for example, depending on a power control scheme (e.g., used for sidelink transmission). A WTRU may be configured to use one or more power control schemes for sidelink. In examples, a first power control scheme may use $P_{c,max}$, where a WTRU may transmit a signal on SL using $P_{c,max}$ power. A second power control scheme may be based on a pathloss, where the transmission power may be determined, for example, based on (e.g., as a function of) the pathloss (e.g., DL pathloss and/or SL pathloss). A WTRU may not perform UL and SL transmission in the same slot, for example, if the power control scheme for SL is based on the first power control scheme. A WTRU may perform UL and SL transmission in the same slot, for example, if the power control scheme for SL is based on the second power control scheme. In examples, a WTRU may not perform UL and SL transmission in the same slot, for example, if the WTRU uses a first power control scheme (e.g., $P_{c,max}$).

A WTRU may modify a planned/granted transmission format to allow transmissions on UL and/or SL. A WTRU may change a planned or granted transmission format, for example, to allow transmission on UL and SL in the same slot. A planned transmission format may be selected, for example, by the WTRU for SL. A granted transmission format may be granted, for example, by the network for UL. Change of a transmission format may include, for example, one or more of: change in a UL/SL MCS, performing puncturing on a UL/SL transmission, change of a TB size and/or transmission of an alternate TB. For example, a WTRU may be provided with a UL grant from a network. A WTRU may receive an SL transmission associated with SL unicast. For example, an SL unicast may use a PSFCH transmission in the same slot as a UL transmission. A WTRU may perform puncturing of a UL transmission, for example, upon a determination that the WTRU may transmit on UL and SL (e.g., PSFCH) at the same time. A WTRU may be configured with an amount of puncturing to be performed. An amount of puncturing to be performed may be based on, for example, a required/selected number of symbols for PSFCH. A WTRU may select an MCS for an initial transmission on SL. A WTRU may change/modify an MCS for a retransmission on SL, for example, if the SL retransmission collides with a UL transmission on the same slot. A WTRU may change/modify the MCS for the retransmission on SL, for example, if the SL retransmission collides with an UL transmission on the same slot and the WTRU decides to transmit SL and UL in the same slot.

A WTRU may inform a network and/or a peer WTRU about a transmission on UL and/or SL. A WTRU may inform an NW and/or a peer WTRU of a change of expected format. A WTRU may inform a network or a peer WTRU about a transmission on UL and SL in the same slot. An indication may include (e.g., may indicate), for example, one or more of the following: SL and UL may be transmitted in the same slot; and/or the different SL/UL format selected by the WTRU (e.g., to ensure transmission of UL and SL in the same slot). An indication may include one or more of a puncturing level, a different MCS, a different TB size, and/or the like. A WTRU may provide the indication, for example, using (e.g., explicit) signaling. In an example, a WTRU may include an indication to a network in uplink control information (UCI). A WTRU may include an indication to a peer WTRU in sidelink control information (SCI). A WTRU may provide an indication implicitly. A WTRU may scramble a demodulation reference signal (DMRS) differently, for example, depending on whether the WTRU transmits in UL and SL in the same slot and/or depending on the different (e.g., selected) transmission format of UL/SL. A WTRU may use a different orthogonal cover code (OCC) of DMRS, for example, depending on whether the WTRU transmits in UL and SL in the same slot and/or depending on the different (e.g., selected) transmission format of UL/SL.

A WTRU may report expected PSFCH transmissions, for example, to a network. A WTRU may report expected PSFCH transmission timing to a network. Reports may be used by the network to properly configure UL grant parameters, for example, if the UL grants conflict with PSFCH transmissions. Reports may be used by a network to schedule UL grants while avoiding PSFCH transmissions. Reports may be used by a network to properly configure UL grant parameters, for example, if the UL grants conflict with PSFCH transmissions and/or for the network to schedule UL grants while avoiding PSFCH transmissions. In an example, a WTRU may provide PSFCH resource timing associated with planned (e.g., periodic) transmissions by another (e.g., peer) WTRU, for example, following the reservation of the periodic resources by the peer WTRU. A WTRU may provide a set of periodic PSFCH resources to a network (e.g., which may correspond to HARQ feedback resources for the planned transmissions of the peer WTRU). A WTRU may provide a set of periodic PSFCH resources to a network, for example, following a transmission of another WTRU associated with periodic transmissions with HARQ feedback enabled. A WTRU may inform a network of a change in PSFCH resources, for example, upon a change in the periodicity/offset/resource (e.g., subchannel) associated with a periodic transmission. A WTRU may report a different set of PSFCH resources and/or indicate a change in a set (e.g., a current set) of PSFCH resources, for example, if one or more of the following applies: the WTRU detects a change in one or more of the periodicity, offset, or resource of another WTRU's periodic transmissions (e.g., associated with a specific sidelink process); the WTRU receives an indication from another WTRU that the other WTRU may change its periodicity/offset/resource associated with periodic transmissions; and/or the WTRU may receive (e.g., from another WTRU or the gNB) a change in the HARQ configuration.

In an example, a WTRU may provide an indication of the timing of PSFCH transmissions, for example, following reception of an SL transmission without reservation. A WTRU may provide an indication (e.g., together with an ACK/NACK indication) to a network (e.g., for mode 1). For example, a WTRU may indicate PSFCH timing implicitly/explicitly to a network with an ACK/NACK indication. A WTRU may indicate PSFCH timing implicitly/explicitly to a network, for example, using one or more of the following: signaling (e.g., in the ACK/NACK indication) one or more of the timing, or relative timing from the ACK/NACK indication of the PSFCH transmission, or received data timing; signaling (e.g., in the ACK/NACK indication) the data priority and/or QoS (e.g., or any additional information used by a network to determine the PSSCH to PSFCH timing distance), for example, if the WTRU signals the received data timing; selecting a resource for an ACK/NACK indication to a network (e.g., that is (pre)configured or predetermined, for example, based on PSFCH timing and/or received data timing to be signaled). A WTRU may provide an indication, for example, in dedicated UCI information (e.g., for mode 2) that may be used for indicating such information. Dedicated UCI information may be configured, for example, to explicitly/implicitly indicate a PSFCH and/or a received data timing (e.g., as described herein).

A WTRU may report expected PSFCH transmission timing to a network, for example, in one or more (e.g., a combination of) an RRC message, a MAC CE, and/or a UCI. In an example, a WTRU may be configured with resources in UCI to signal a relative offset (e.g., from the transmission of UCI) for a planned PSFCH transmission timing and/or received data timing. A WTRU may trigger transmission of an SL BSR (or similar MAC CE), for example, upon reception of a transmission by another WTRU. A WTRU may report the timing of a corresponding PSFCH, for example, in an SL BSR or MAC CE. A WTRU may send a SidelinkUEAssistance RRC message (e.g., or a similar RRC message) to a network, for example, if another WTRU initiates a periodic or reserved transmission. A WTRU may report (e.g., the WTRU's) PSFCH timing associated with another WTRU's periodic transmission.

A WTRU may be configured to (e.g., attempt to) avoid collisions between different UL/SL transmissions, for example, using one or more approaches involving resource selection decisions. A WTRU may perform a resource selection procedure (e.g., considering configured SR resources). For example, a WTRU may consider the time/frequency location of configured SR resources (e.g., SL or UL SR resources) in a resource selection procedure, which may avoid or reduce the likelihood of a collision between SR transmission on UL and SL transmissions. A WTRU may exclude (e.g., the WTRU's) configured SR resources (e.g., or a subset of the WTRU's configured SR resources) from the set of available resources, for example, for mode 2 resource selection. A WTRU may favor the selection of resources (e.g., in mode 2 resource selection) that do not conflict with the configured SR resources (e.g., or a subset of its configured SR resources). For example, a WTRU may assign a higher weight to a selection of resources that do not conflict with SR resources.

A WTRU may (e.g., in excluding SR resources and/or favoring non-SR resources) perform a behavior (e.g., only) for SR resources that may be associated with, for example, an SL or UL, an SR resource associated with a (e.g., specific) QoS, and/or the like. A WTRU may perform a behavior (e.g., only) for SR resources associated with SL or UL. For example, a WTRU may exclude SR resources for SL or UL only. A WTRU may perform a behavior (e.g., only) for an SR resource that may be associated with a certain (e.g., specific, selected, configured, indicated) QoS. A WTRU may exclude SL SR resources that may be associated with logical channels, for example, in which the QoS is higher than the QoS of the data that the WTRU may transmit on the selected sidelink resources. A WTRU may exclude SL SR resources that may be associated with logical channels, for example, in which the QoS is higher than one or more (pre)configured value(s).

A WTRU may be configured to (e.g., attempt to) avoid collisions, for example, using one or more approaches involving use of multi-RAT dual connectivity (MR-DC). A WTRU may change a UL split between master cell group (MCG) and secondary cell group (SCG), for example, based on SL traffic. In an example, a WTRU may change the WTRU's split of UL transmissions between MCG and SCG, for example, based on the presence of SL traffic. A WTRU may be configured with one or more split DRBs between MCG and SCG. A WTRU may change the relative amount of traffic sent via MCG or SCG for (e.g., split) DRBs based on the presence of SL traffic. A WTRU may (e.g., decide to) change the amount of traffic between MCG and SCG, for example, based on one or more of the following: QoS associated with SL traffic, QoS associated with UL traffic, congestion on SL, WTRU capability limitations, and/or the like.

A WTRU may (e.g., decide to) change the amount of traffic between MCG and SCG, for example, based on a QoS associated with the SL traffic. A WTRU may change the UL split between MCG and SCG for SL traffic. For example, a WTRU may change the UL split between MCG and SCG (e.g., only) for SL traffic associated with a specific QoS and/or a specific LCH. A WTRU may change the UL split between MCG and SCG, for example, (e.g., only) if the WTRU has data associated with the QoS and/or LCH A WTRU may (e.g., decide to) change the amount of traffic between MCG and SCG, for example, based on a QoS associated with the UL traffic. For example, a WTRU may change the UL split between MCG and SCG (e.g., only) for a split DRB configured with a specific QoS. A WTRU may change a UL split between MCG and SCG (e.g., only) for certain DBRs or LCHs. A WTRU may be configured (e.g., on a per DRB/LCH basis), for example, to indicate whether to change the UL split of traffic from the presence of SL traffic.

A WTRU may (e.g., decide to) change the amount of traffic between MCG and SCG based on congestion on SL. For example, a WTRU may (e.g., be allowed to) change the UL split between an MCG and an SCG.

A WTRU may (e.g., decide to) change the amount of traffic between an MCG and an SCG based on WTRU capability limitations. In an example of a capability limitation, a WTRU may not be capable of transmitting on UL MCG/UL SCG and SL simultaneously on the carriers configured for UL MCG/SCG and SL.

A WTRU may change a UL split between an MCG and an SCG, for example, upon the occurrence of one or more of the following triggers: the WTRU may receive SL data associated with one or more LCHs; the amount of SL data (e.g., associated with one or more LCHs) may be above a threshold; and/or the like.

A WTRU may (e.g., upon the occurrence(s) of one or more triggers, such as described herein), perform one or more of the following to change the UL split between MCG and SCG. A WTRU may (e.g., based on a trigger) change the primary path of a UL split bearer from one CG to another CG (e.g., for a period of time, or until the occurrence of a different threshold). In an example, a WTRU may change the primary path to a CG that does not conflict with the TX chain being used to perform SL data transmission. A WTRU may (e.g., based on a trigger) perform transmissions for a particular bearer (e.g., only on one CG), for example, for a certain period of time, or until the occurrence of a different trigger. A WTRU may change the usage percentage of a primary path (e.g., ulDataSplitThreshold), for example, relative to the network configured amount. A WTRU may change the usage percentage, for example, by an amount relative to the amount of SL data in its buffers. A WTRU may change the usage percentage, for example, by an amount relative to the QoS and/or LCH of the data in the SL buffers. A WTRU may change the usage percentage by an amount relative to the QoS and/or LCH associated with the UL bearer itself.

A WTRU may change the active SL control/scheduling CG. A WTRU configured in DC may receive SL scheduling (e.g., mode 1 scheduling) from one of multiple (e.g., two) cell groups. A WTRU may decode SL scheduling (e.g., only) on the CG associated with active SL control/scheduling at a given time. In an example, a WTRU may change the active SL control/scheduling cell group (CG) from MCG or SCG or vice versa. A WTRU may receive (e.g., explicit) signaling from a network to change a CG associated with monitoring SL scheduling. A WTRU may receive signaling in one or more of the following: an RRC configuration message, a MAC CE, a DCI message, and/or the like. A DCI message may be a dedicated DCI message to change an active scheduling CG. A DCI message may be an SL DCI (e.g., similar to DCI 5A) used for scheduling SL. An SL DCI may include a field (e.g., a dedicated field) to indicate a change of the DCI. Signaling (or a signaling message) may indicate which CG to change to for the active SL scheduling CG, for example, in the case of multi-connectivity.

In an example, a WTRU may (e.g., implicitly) determine the active scheduling CG, for example, based on one or more of the following: a Uu-bearer configuration; a QoS and/or an LCG configuration associated with a bearer configuration. A WTRU may determine the CG associated with active SL monitoring to be, for example, the CG where a URLLC bearer (e.g., MCG bearer or SCG bearer) is not configured. A WTRU may determine the CG associated with active SL monitoring to be, for example, the CG for which the bearers are associated with one or more of: the relatively low (e.g., lowest) QoS, the relatively small/large (e.g., smallest/largest) allowable transmission duration, the relatively small/large (e.g., smallest/largest) configured grant periodicity, etc. A WTRU may change an active SL scheduled CG, for example, based on triggers related to UL discontinuous reception (DRX). A WTRU may move the active scheduled CG to the other CG, for example, if the WTRU enters DRX on the first CG.

FIG. 3 illustrates an example of performing uplink and sidelink operation with prioritization. Examples disclosed herein and other examples may operate in accordance with example 300 shown in FIG. 3. Performance of uplink and sidelink (e.g., simultaneous) operation may comprise one of more of 302 through 310 (e.g., as described herein). In 302, a determination may be made whether to prioritize an SL LCG based on an SL prioritization threshold and, on a condition that a UL prioritization threshold is configured, the UL prioritization threshold. In 304, a determination may be made whether a prioritization value associated with the SL LCG is lower than the SL prioritization threshold. In 306, on a condition that the UL prioritization threshold is configured, a determination may be made to determine at least whether a UL LCG has a prioritization value that is equal to or higher than the UL prioritization threshold. In 308, a determination may be made whether to prioritize an SL BSR based on a size of a UL grant and the determination of whether to prioritize the SL LCG. In 310, a buffer status may be reported based on the determination of whether to prioritize the SL BSR.

Figure 4:
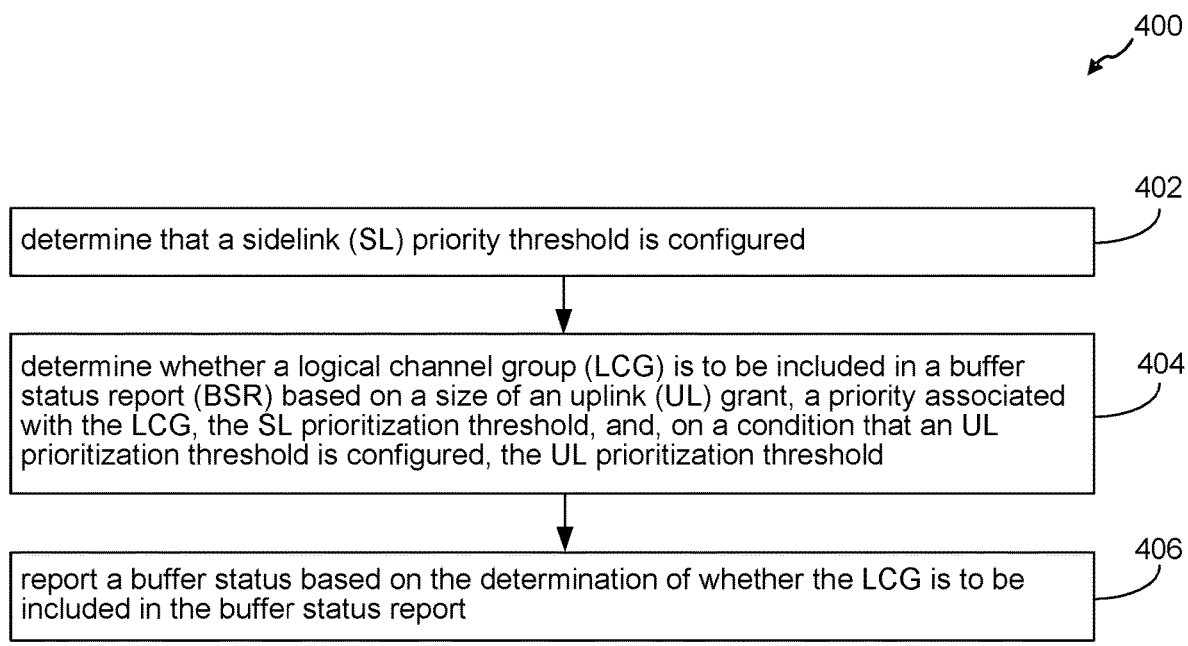
FIG. 4 illustrates an example of performing uplink and sidelink operation with prioritization.

FIG. 4 illustrates an example of performing uplink and sidelink operation with prioritization. Examples disclosed herein and other examples may operate in accordance with example 400 shown in FIG. 4. Performance of uplink and sidelink (e.g., simultaneous) operation may comprise 402 through 406. In 402, a determination may be made that a sidelink (SL) priority threshold is configured. In 404, a determination may be made whether an LCG is to be included in a BSR based on a size of a UL grant, a priority associated with the LCG, the SL prioritization threshold, and, on a condition that an UL prioritization threshold is configured, the UL prioritization threshold. In 406, a buffer status may be reported based on the determination of whether the LCG is to be included in the buffer status report.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) comprising:
a processor configured to:
   determine whether to prioritize a side link (SL) logical channel (LCH) group (LCG) based on a SL prioritization threshold and an uplink (UL) prioritization threshold, wherein the determination of whether to prioritize the SL LCG comprises a determination of whether a priority associated with the SL LCG is higher than the SL prioritization threshold and a determination of whether a priority associated with an UL LCG is lower than the UL prioritization threshold, wherein the priority associated with the SL LCG is determined using a highest priority among one or more LCHs via which SL data is transmitted, and wherein the priority associated with the UL LCG is determined using a highest priority among one or more LCHs via which UL data is transmitted;
   determine whether to prioritize SL buffer status reporting (BSR) based on a size of an UL grant and the determination of whether to prioritize the SL LCG; and
   send a transmission, wherein the transmission comprises at least one of a SL buffer status or an UL buffer status based on the determination of whether to prioritize the SL BSR.

2. The WTRU of claim 1, wherein the processor is configured to prioritize the SL BSR over UL BSR in a logical channel prioritization (LCP) procedure on a condition that the SL BSR is determined to be prioritized.

3. The WTRU of claim 2, wherein the SL BSR is included first in the LCP procedure on a condition that the SL BSR is determined to be prioritized.

4. The WTRU of claim 1, wherein the SL LCG is a first SL LCG and the first SL LCG is determined to be prioritized, and the processor is configured to:
   determine that a second SL LCG is not prioritized; and
   determine that the size of the UL grant is insufficient for reporting a buffer status of the second SL LCG, wherein, on a condition that the SL BSR is determined to be prioritized, the transmission comprises a buffer status of the first SL LCG and does not comprise the buffer status of the second SL LCG.

5. The WTRU of claim 1, wherein the SL LCG is determined not to be prioritized, and, based on a determination not to prioritize the SL BSR, the processor is configured to determine whether to include a buffer status of the SL LCG in the transmission based on the size of the UL grant.

6. The WTRU of claim 1, wherein the one or more LCHs via which the SL data is transmitted are associated with the SL LCG, and the one or more LCHs via which the UL data is transmitted are associated with the UL LCG.

7. The WTRU of claim 1, wherein the SL LCG is determined to be prioritized on a condition that the priority associated with the SL LCG is higher than the SL prioritization threshold, the UL prioritization threshold is configured, and the priority associated with the UL LCG is lower than the UL prioritization threshold.

8. The WTRU of claim 1, wherein the SL LCG is determined not to be prioritized on a condition that the priority associated with the SL LCG is lower than the SL prioritization threshold, the UL prioritization threshold is not configured, or the priority associated with the UL LCG is higher than the UL prioritization threshold.

9. The WTRU of claim 1, wherein a prioritization value associated with the SL LCG, if lower, indicates a higher priority associated with the SL LCG, and, if higher, indicates a lower priority associated with the SL LCG and wherein a prioritization value associated with the UL LCG, if lower, indicates a higher priority associated with the UL LCG, and, if higher, indicates a lower priority associated with the UL LCG.

10. A method performed by a wireless transmit/receive unit (WTRU), comprising:
   determining whether to prioritize a side link (SL) logical channel (LCH) group (LCG) based on a SL prioritization threshold and an uplink (UL) prioritization threshold, wherein the determination of whether to prioritize the SL LCG comprises a determination of whether a priority associated with the SL LCG is higher than the SL prioritization threshold and a determination of whether a priority associated with an UL LCG is lower than the UL prioritization threshold;
   determining whether to prioritize SL buffer status reporting (BSR) based on a size of an UL grant and the determination of whether to prioritize the SL LCG, wherein the priority associated with the SL LCG is determined using a highest priority among one or more LCHs via which SL data is transmitted, and wherein the priority associated with the UL LCG is determined using a highest priority among one or more LCHs via which UL data is transmitted; and
   sending a transmission, wherein the transmission comprises at least one of a SL buffer status or an UL buffer status based on the determination of whether to prioritize the SL BSR.

11. The method of claim 10, further comprising prioritizing the SL BSR over UL BSR in a logical channel prioritization (LCP) procedure on a condition that the SL BSR is determined to be prioritized.

12. The method of claim 10, wherein the SL LCG is a first SL LCG and the first SL LCG is determined to be prioritized, and the method further comprising:

determining that a second SL LCG is not prioritized; and determining that the size of the UL grant is insufficient for reporting a buffer status of the second SL LCG, wherein, on a condition that the SL BSR is determined to be prioritized, the transmission comprises a buffer status of the first SL LCG and does not comprise the buffer status of the second SL LCG.

13. The method of claim 10, wherein the SL LCG is determined not to be prioritized, and, based on a determination not to prioritize the SL BSR, the method further comprises determining whether to include a buffer status of the SL LCG in the transmission based on the size of the UL grant.

* * * * *